US011373265B2

(12) United States Patent
Poder et al.

(10) Patent No.: US 11,373,265 B2
(45) Date of Patent: Jun. 28, 2022

(54) DIGITAL IDENTIFICATION DOCUMENT

(71) Applicant: Idemia Identity & Security USA LLC, Reston, VA (US)

(72) Inventors: Daniel Poder, Brookline, MA (US); Robert Andrew Eckel, Andover, MA (US)

(73) Assignee: Idemia Identity & Security USA LLC, Reston, VA (US)

( * ) Notice: Subject to any disclaimer, the term of this patent is extended or adjusted under 35 U.S.C. 154(b) by 127 days.

(21) Appl. No.: 16/402,631

(22) Filed: May 3, 2019

(65) Prior Publication Data

US 2019/0362458 A1 Nov. 28, 2019

Related U.S. Application Data

(63) Continuation of application No. 14/470,688, filed on Aug. 27, 2014, now Pat. No. 10,282,802.

(60) Provisional application No. 61/870,591, filed on Aug. 27, 2013.

(51) Int. Cl.
| | |
|---|---|
| *G06T 1/00* | (2006.01) |
| *G06F 21/32* | (2013.01) |
| *G06F 21/62* | (2013.01) |
| *G07C 9/25* | (2020.01) |

(52) U.S. Cl.
CPC .............. *G06T 1/005* (2013.01); *G06F 21/32* (2013.01); *G06F 21/6245* (2013.01); *G06T 1/0071* (2013.01); *G07C 9/25* (2020.01); *G06F 2221/2143* (2013.01); *G06T 2201/0051* (2013.01)

(58) Field of Classification Search
CPC .................. G06T 1/005; G06T 1/0071; G06T 2201/0051; G06T 1/0021; G06T 2201/0052; G07C 9/25; G06F 21/32; G06F 21/6245; G06F 2221/2143; G06F 21/34; H04L 67/10; G06K 9/00288
See application file for complete search history.

(56) References Cited

U.S. PATENT DOCUMENTS

| | | | |
|---|---|---|---|
| 3,947,128 A * | 3/1976 | Weinberger | ........ G06K 9/00013 356/71 |
| 5,841,886 A | 11/1998 | Rhoads | |
| 6,259,405 B1 | 7/2001 | Stewart et al. | |
| 6,414,635 B1 | 7/2002 | Stewart et al. | |
| 6,895,104 B2 * | 5/2005 | Wendt | ................... G06K 9/0008 283/69 |
| 7,004,388 B2 | 2/2006 | Kohta | |
| 7,172,115 B2 * | 2/2007 | Lauden | ................... G07C 9/257 235/380 |

(Continued)

*Primary Examiner* — Manav Seth
(74) *Attorney, Agent, or Firm* — Armstrong Teasdale LLP

(57) ABSTRACT

Some implementations may include a computer-assisted method for authenticating a person at a point of service, the method including: receiving a digital identification document including a digital biometric of the person and a digital watermark, the digital watermark encoding personally identifiable information of the person; retrieving the digital watermark from the received digital identification document; extracting the personally identifiable information from the retrieved digital watermark; and authenticating the person identified by the digital biometric based on the retrieved digital watermark.

21 Claims, 23 Drawing Sheets

(56) References Cited

U.S. PATENT DOCUMENTS

| | | | |
|---|---|---|---|
| 7,224,820 B2 * | 5/2007 | Inomata | G06T 1/0028 382/100 |
| 7,359,553 B1 * | 4/2008 | Wendt | G06K 9/0008 358/2.99 |
| 8,385,590 B1 | 2/2013 | Moorer | |
| 9,407,620 B2 | 8/2016 | Miu | |
| 9,426,328 B2 | 8/2016 | Martin | |
| 9,497,349 B2 * | 11/2016 | Martin | H04N 1/32309 |
| 9,501,882 B2 | 11/2016 | Saravanan | |
| 9,947,000 B2 * | 4/2018 | Weiss | G06Q 20/383 |
| 9,978,112 B2 * | 5/2018 | Poder | G06T 1/0021 |
| 10,204,390 B2 * | 2/2019 | Martin | H04N 1/32309 |
| 10,249,015 B2 * | 4/2019 | Poder | G06T 1/0071 |
| 10,282,802 B2 * | 5/2019 | Poder | G06T 1/0071 |
| 10,311,435 B2 * | 6/2019 | Eckel | G06Q 20/4014 |
| 10,320,778 B2 * | 6/2019 | Poder | G06F 21/64 |
| 10,692,167 B2 * | 6/2020 | Poder | G06T 1/0071 |
| 10,957,005 B2 * | 3/2021 | Poder | G06T 1/0071 |
| 2001/0001239 A1 | 5/2001 | Stewart | |
| 2002/0056043 A1 | 5/2002 | Glass | |
| 2002/0073310 A1 | 6/2002 | Benantar | |
| 2002/0118394 A1 | 8/2002 | McKinley et al. | |
| 2002/0157005 A1 | 10/2002 | Brunk et al. | |
| 2003/0014372 A1 * | 1/2003 | Wheeler | H04L 63/0823 705/71 |
| 2003/0023858 A1 | 1/2003 | Banerjee et al. | |
| 2003/0085808 A1 | 5/2003 | Goldberg | |
| 2003/0136828 A1 | 7/2003 | Takesada et al. | |
| 2003/0138128 A1 * | 7/2003 | Rhoads | G07F 7/1008 382/100 |
| 2003/0154406 A1 | 8/2003 | Honarvar et al. | |
| 2004/0049401 A1 | 3/2004 | Carr | |
| 2004/0114779 A1 | 6/2004 | Blazey | |
| 2004/0153649 A1 | 8/2004 | Rhoads et al. | |
| 2004/0243806 A1 | 12/2004 | McKinley et al. | |
| 2004/0248588 A1 | 12/2004 | Pell et al. | |
| 2004/0258274 A1 | 12/2004 | Brundage et al. | |
| 2005/0039022 A1 | 2/2005 | Venkatesan | |
| 2005/0063562 A1 | 3/2005 | Brunk | |
| 2005/0160271 A9 | 7/2005 | Brundage et al. | |
| 2005/0240779 A1 | 10/2005 | Aull et al. | |
| 2005/0243199 A1 | 11/2005 | Bohaker et al. | |
| 2005/0246550 A1 | 11/2005 | Orbke et al. | |
| 2005/0256724 A1 | 11/2005 | Rasin et al. | |
| 2006/0206351 A1 | 9/2006 | Hodges et al. | |
| 2006/0212931 A1 | 9/2006 | Shull et al. | |
| 2006/0282661 A1 | 12/2006 | True | |
| 2007/0016790 A1 * | 1/2007 | Brundage | B42D 25/23 713/176 |
| 2007/0083915 A1 | 4/2007 | Janakiraman et al. | |
| 2007/0091376 A1 | 4/2007 | Calhoon et al. | |
| 2008/0065895 A1 * | 3/2008 | Liu | H04L 9/3263 713/176 |
| 2009/0277961 A1 | 11/2009 | Mak | |
| 2009/0307097 A1 | 12/2009 | De Faria | |
| 2009/0307132 A1 | 12/2009 | Phillips | |
| 2009/0320106 A1 * | 12/2009 | Jones | G06Q 20/206 726/5 |
| 2010/0052852 A1 | 3/2010 | Mohanty | |
| 2010/0170947 A1 | 7/2010 | Christofferson | |
| 2010/0172539 A1 | 7/2010 | Sugimoto et al. | |
| 2010/0228632 A1 | 9/2010 | Rodriguez | |
| 2011/0077983 A1 | 3/2011 | Hua et al. | |
| 2011/0167059 A1 | 7/2011 | Fallah | |
| 2011/0247058 A1 * | 10/2011 | Kisters | G06F 21/31 726/5 |
| 2011/0275360 A1 | 11/2011 | Sample et al. | |
| 2012/0075442 A1 | 3/2012 | Vujic | |
| 2012/0078723 A1 | 3/2012 | Stewart | |
| 2012/0163653 A1 | 6/2012 | Anan et al. | |
| 2012/0198232 A1 | 8/2012 | Hannel et al. | |
| 2012/0323614 A1 | 12/2012 | Lin | |
| 2012/0330769 A1 | 12/2012 | Arceo | |
| 2013/0167212 A1 | 6/2013 | Azar et al. | |
| 2013/0218931 A1 | 8/2013 | Lewis | |
| 2013/0223674 A1 | 8/2013 | Eckel et al. | |
| 2013/0243266 A1 * | 9/2013 | Lazzouni | G06F 21/34 382/115 |
| 2013/0340052 A1 | 12/2013 | Jakobsson | |
| 2014/0098284 A1 | 4/2014 | Oberpriller et al. | |
| 2014/0337930 A1 | 11/2014 | Hoyos et al. | |
| 2015/0012307 A1 | 1/2015 | Moss | |
| 2015/0063655 A1 | 3/2015 | Poder et al. | |
| 2015/0063657 A1 | 3/2015 | Poder et al. | |
| 2015/0067344 A1 | 3/2015 | Poder et al. | |
| 2016/0127856 A1 | 5/2016 | Link, II | |
| 2016/0157150 A1 | 6/2016 | Wirtanen et al. | |
| 2016/0358298 A1 | 12/2016 | Martin | |
| 2017/0006010 A1 | 1/2017 | Miu | |
| 2017/0041759 A1 | 2/2017 | Gantert et al. | |
| 2017/0053373 A1 * | 2/2017 | Martin | |
| 2017/0069151 A1 | 3/2017 | Saravanan | |
| 2017/0118209 A1 | 4/2017 | Saravanan | |

\* cited by examiner

DIGITAL IDENTIFICATION DOCUMENT

CROSS-REFERENCE TO RELATED APPLICATION(S)

This application is a divisional of U.S. patent application Ser. No. 14/470,688, filed Aug. 27, 2014, now U.S. Pat. No. 10,282,802, which claims the benefit of U.S. Provisional Application No. 61/870,591 filed Aug. 27, 2013, which is incorporated by reference in its entirety.

TECHNICAL FILED

This document generally relates to digital identification document.

BACKGROUND

Digital watermarking may be used on identification documents, such as digital identification documents, as a security feature to prevent fraud.

SUMMARY

In one aspect, some implementations provide a computer-assisted method for digitizing an identification document, the method including receiving a digital biometric of a subject; generating a digital identification document by applying a digital watermark, the digital watermark encoding personally identifiable information of the subject identified by the digital biometric; and issuing the digital identification document, the digital identification document comprising both the digital watermark and the digital biometric.

Implementations may include one or more of the following features. The method may further include extracting characteristics from the digital biometric, the characteristics identifying the subject; and storing the extracted characteristics at a searchable system of record wherein a matching record located at the searchable system provides a positive identification of the subject. Storing the characteristics may include storing personally identifiable information of the subject along with the extracted characteristics in the searchable system of record. Receiving a digital biometric of a subject comprises receiving a digital facial biometric of the subject. Receiving a digital biometric of a subject comprises receiving a digital finger-print of the subject. Receiving a digital biometric of a subject comprises receiving an iris or retina scan the subject. Issuing the digital identification document comprises issuing the digital identification document to a mobile computing device held by the subject.

The method may further include receiving a request to renew the digital identification document; and issuing a renewed digital identification document after verifying the renewal request, the renewed digital identification document also including both the digital biometric and the digital watermark.

The method may further include issuing the digital identification document to include personally identifiable information as well as information other than the personally identifiable information. The method may further include receiving a request to update the information other than the personally identifiable information; and issuing a replacement identification document with the updated information other than the personally identifiable information, the replacement digital identification document comprising both the digital watermark and the digital biometric.

The method may further include receiving a request for a replacement identification document and an updated digital biometric of the subject; in response to authenticating that the request is genuine, generating the replacement identification document by applying the digital watermark to encode the personally identifiable information; and issuing the replacement digital identification document, the replacement digital identification document including the updated digital biometric and the digital watermark.

The method may further include securing the digital identification document to prevent an alteration thereof. Securing the digital identification may include generating security check information based the digital identification document; and storing the generated security check information to be compared against. Generating security check information may include generating least one of: a digital certificate of at least a portion of the digital identification document, an encryption of at least a portion of the digital identification document using a private key of an issuing authority, a hash of at least a portion of the digital identification document, a digest of at least a portion of the digital identification document, or a checksum of at least a portion of the digital identification document.

The method may further include suspending or revoking the digital identification document in response to a validated request for suspension or revocation. Suspending or revoking the digital identification document may include removing the digital identification document from a mobile computing device of the subject. Suspending or revoking the digital identification document may include issuing a suspended or revoked digital identification document to overwrite the previously issued digital identification document on the mobile computing device of the subject.

In another aspect, some implementations provide a method for authenticating a person at a point of service, including receiving a digital identification document with a digital biometric of the person, and a digital watermark encoding personally identifiable information of the person; and authenticating the person identified by the digital biometric based on the digital identification document.

Implementations may include one or more of the following features. Authenticating the person comprises: comparing the personally identifiable information against a searchable system of record. The method may further include transmitting the personally identifiable information to a remote server; and receiving results of comparing the personally identifiable information against the searchable system of record at the remote server. Authenticating the person may include receiving a biometric of the person presenting the digital identification document at the point of service; and comparing the biometric of the person at the point of service with the digital biometric on the digital identification document. The method may further include retrieving a first portion of personally identifiable information of the person identified by the digital biometric on the digital identification document; extracting a second portion of personally identifiable information of the person from the digital watermark on the digital identification document; and validating the digital identification document based on the first portion of personally identifiable information and the second portion of personally identifiable information.

In yet another aspect, some implementations provide system for digitizing an identification document, the system comprising at least one computer processor configured to perform the operations of: receiving a digital biometric of a subject; generating a digital identification document by applying a digital watermark, the digital watermark encoding personally identifiable information of the subject identified by the digital biometric; and issuing the digital identification document, the digital identification document comprising both the digital watermark and the digital biometric.

Implementations may include one or more of the following features. The operations may further include extracting characteristics from the digital biometric, the characteristics identifying the subject; and storing the extracted characteristics at a searchable system of record wherein a matching record located at the searchable system provides a positive identification of the subject. Storing the characteristics comprises the operation of storing personally identifiable information of the subject along with the extracted characteristics in the searchable system of record. Receiving a digital biometric of a subject comprises the operation of receiving a digital facial biometric of the subject. Receiving a digital biometric of a subject comprises the operation of receiving a digital finger-print of the subject. Receiving a digital biometric of a subject comprises the operation of receiving an iris or retina scan the subject. Issuing the digital identification document may include issuing the digital identification document to a mobile computing device held by the subject.

The operations may further include receiving a request to renew the digital identification document; and issuing a renewed digital identification document after verifying the renewal request, the renewed digital identification document also comprising both the digital biometric and the digital watermark. The operations may further include issuing the digital identification document to include personally identifiable information as well as information other than the personally identifiable information. The operations may further include receiving a request to update the information other than the personally identifiable information; and issuing a replacement identification document with the updated information other than the personally identifiable information, the replacement digital identification document including both the digital watermark and the digital biometric.

The operations may further include: receiving a request for a replacement identification document and an updated digital biometric of the subject; in response to authenticating that the request is genuine, generating the replacement identification document by applying the digital watermark to encode the personally identifiable information; and issuing the replacement digital identification document, the replacement digital identification document comprising the updated digital biometric and the digital watermark.

The operations may further include: securing the digital identification document to prevent an alteration thereof. Securing the digital identification may include the operations of generating security check information based the digital identification document; and storing the generated security check information to be compared against. Securing the digital identification comprises the operations of generating at least one of: a digital certificate of at least a portion of the digital identification document, an encryption of at least a portion of the digital identification document using a private key of an issuing authority, a hash of at least a portion of the digital identification document, a digest of at least a portion of the digital identification document, or a checksum of at least a portion of the digital identification document.

The operations may further include suspending or revoking the digital identification document in response to a validated request for suspension or revocation. Suspending or revoking the digital identification document may include removing the digital identification document from a mobile computing device of the subject. Suspending or revoking the digital identification document may include issuing a suspended or revoked digital identification document to overwrite the previously issued digital identification document on the mobile computing device of the subject.

In still another aspect, some implementations provide a mobile computing device for authenticating a person, the mobile computing device comprising at least one processor configured to perform operations including: receiving a digital identification document with a digital biometric of the person, and a digital watermark encoding personally identifiable information of the person; and authenticating the person identified by the digital biometric based on the digital identification document.

Implementations may include one or more of the following features. Authenticating the person may include: comparing the personally identifiable information against a searchable system of record. The operations may further include transmitting the personally identifiable information to a remote server; and receiving results of comparing the personally identifiable information against the searchable system of record at the remote server.

Authenticating the person may include receiving a biometric of the person presenting the digital identification document at the point of service; comparing the biometric of the person at the point of service with the digital biometric on the digital identification document. The operations may further include retrieving a first portion of personally identifiable information of the person identified by the digital biometric on the digital identification document; extracting a second portion of personally identifiable information of the person from the digital watermark on the digital identification document; and validating the digital identification document based on the first portion of personally identifiable information and the second portion of personally identifiable information.

In yet still another aspect, some implementations provide a computer-readable medium, comprising information encoding a digital identification document of a subject, the digital identification document generated by: receiving a digital biometric of the subject; applying, to the digital identification document, a digital watermark to encode personally identifiable information of the subject portrayed in the portrait; and issuing the digital identification document with the digitally watermark and the digital biometric identifying the subject.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

A digital identification document may be in an electronic form. The digital identification document may include a digital biometric and at least one digital watermark. The digital biometric may include a digital facial portrait, a finger-print, an iris scan, a retina scan, etc. The digital biometric can identify the person holding the digital identification document. The digital watermark, on the other hand, may embedded in the digital identification document and may be imperceptible to naked eyes. The digital watermark may encode personally identifiable information of the holder of the digital identification document. The digital watermark may be used to detect unauthorized alterations of the digital identification document. Thus, the validity of the digital identification document may be established based on the embedded digital watermark. The digital identification document may be presented on a mobile computing device of the holder, such as, for example, a smartphone, a tablet, etc.

Figure 1:
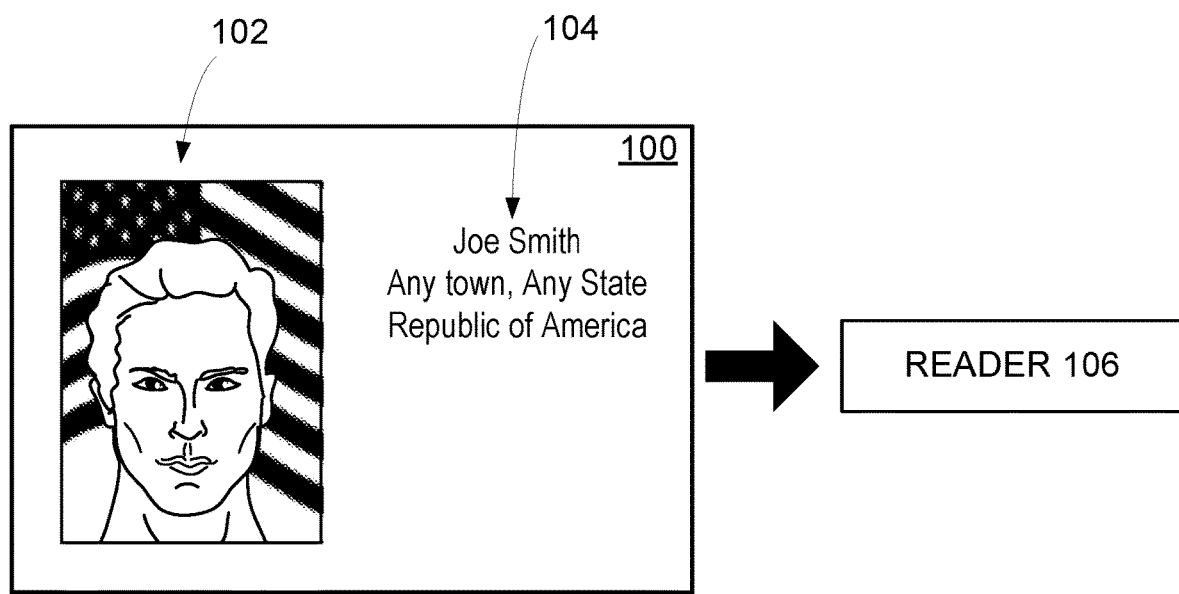
FIG. 1 illustrates an example identification document according to some implementations.

FIG. 1 illustrates an example identification document 100 according to some implementations. Identification document 100 may be a government-issued identification document, such as, for example, a driver's license issued by the department of motor vehicles (DMV) of a state, a passport issued by the state department, a social security card issued by the social security administration (SSA), a medicare card issued by the department of health and human services (DHS), a Medicaid card issued by the DHHS, etc. The identification document may be issued by a government entity, for example, the DMV at the state level, or the state department at the federal level. The identification document may also be issued by non-government entities, such as a contracting entity of a government agency. Identification document 100 may also be other identification documents, such as, for example, a student identification card issued by a school, a membership card issued by an organization, an employee identification card issued by an employer, etc.

Portrait 102 may include a facial portrait of the holder of the identification document. The facial portrait may identify the person holding the identification document. The facial portrait may be 2×2 in and showing the front face of the holder. In some implementations, portrait 102 may include a facial biometric of the document holder. In some implementations, portrait 102 may manifest as other forms of biometrics, such as, for example, a finger-print, a palm-print, a retina scan, a iris scan, a pupil scan, etc.

Personally identifiable information 104 may include name (including full name, first name, last name, middle/initials), residential address, gender, nationality, occupation, marital status, eye color, hair color, blood type etc. Personally identifiable information 104 may also include numerical terms such as date of birth, height, weight, election zone, document number, issue date, etc. Portions of personally identifiable information may be printed on the identification document.

Identification document 100 may be verified by reader 106. Reader 106 may represent a human inspector, for example, a cashier at a liquor store, a security guard at a building, etc. In some implementations, the human inspector may be assisted by a reader device. The identification document may be analyzed by reader 106 to verify that (i) the identification document is authentic and has not been forged or altered; (ii) the person presenting the identification document is the person identified by the identification document.

To prove the source of an identification document, digital watermark(s) may be embedded into an identification document. Additionally, digital watermark(s) may carry personally identifiable information about the holder. Thus, digital watermark(s) can be used on an identification document to authenticate the identification document and carry information about the identity of the holder Digital watermark(s) may be secure, covert and machine-readable. Digital watermark(s) may be generally imperceptible to naked eyes. In fact, digital watermark(s) may generally appear as noise, for example, added to a background noise. However, altering a digital watermark may be virtually impossible, and the mere lack of presence of a digital watermark can immediately indicate tampering and likely counterfeiting. Hence, digital watermark(s) used in an identification document may provide strong and effective deterrence to counterfeit.

To validate an identification document, steganography may analyze the digital watermark to identify the source and reveal the information identifying the holder. In some implementations, data contents encoded by the digital watermarks may be encrypted so that the encoded data contents may remain secure, as an additional security mechanism. Such encrypted data contents may be decrypted first. In some implementations, the digital watermark may be initially analyzed to extract frequency domain information. The frequency domain information may include spectrum information manifested by, for example, the digital cosine transforms (DCT) coefficients in a particular spatial frequency range. In contrast to spatial domain information, such frequency domain information may be robust to cropping or translation of the original document. Hence, the frequency domain information may be more tamper-proof and more resilient to artifacts during field use. Likewise, mixed-domain information, i.e., information from both spatial domain and frequency domain may provide similar degree of robustness against tampering and artifacts. However, the implementations disclosed herein are not limited to the use of frequency domain information alone or the use of mixed-domain information. Spatial domain information may be used according to the same scheme as disclosed herein.

Figure 2A:
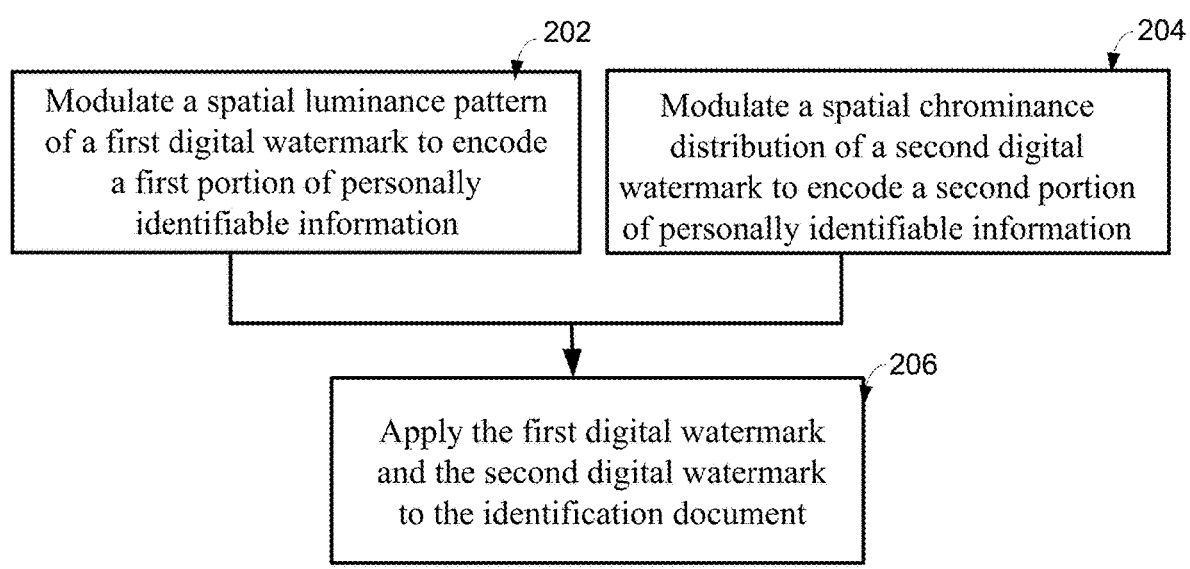
FIG. 2A is a flow chart showing an example method of combining luminance and chrominance modulations to digitally watermark an identification document according to some implementations.

FIG. 2A is a flow chart showing an example method of combining luminance and chrominance modulations to digitally watermark an identification document according to some implementations. A spatial luminance pattern associated with a first digital watermark may be modulated to encode a first portion of personally identifiable information (202). The spatial luminance pattern may refer to an intensity map of brightness. The luminance may be gamma corrected, and referred to as luma. Gamma correction generally tailors the presentation of brightness in a non-linear fashion, for example, according to a power-law. The non-linear correction may enhance visual perception of the encoded color. The modulation may manifest as, for example, a spatial Moire's pattern. Moire's patterns may include line patterns, complex shapes, or even symbols. The patterns, shapes, and symbols may be linked to the issuer, such as the DMV, the state department, an employer, etc. The modulation may reveal the information encoded, such as a number or an alphabetic letter. The encoded information may also be embedded in the granny noise of the intensity pattern and may be undetectable to the naked eyes. Moreover, the encoded information may be encrypted to provide additional security.

On the same identification document, a spatial chrominance distribution associated with a second digital watermark may be modulated (204). The chrominance pattern may refer to a color map. Color maps may be indexed in a multi-dimensional color space. For example, an RGB space may be based on the primary colors of red, green, and blue. An example color space may also be based on the three primary colors of cyan, magenta, and yellow. In some implementations, the chrominance pattern may also use a color map indexed by two components, for example, based on the U and V components of the YUV model, or based on the Cb and Cr components of the YCbCr model, or based on the Pb and Pr components of the YPbPr model. The encoded information may manifest as color smear patterns showing numbers, alphabetical letters, or symbols. The encoded information may appear as color aberration noise unperceivable to naked eyes. Similar to the first digital watermark with modulated spatial luminance pattern, the second modulated spatial chrominance distribution may carry encrypted information.

In some implementations, the first digital watermark with the modulated spatial luminance pattern and the second digital watermark with the modulated spatial chrominance distribution may be applied to the same identification document (206). The two digital watermarks may be applied to different sides of the identification document, for example, the front and back of a driver license, front and back of any given page of a passport, etc. The two digital watermarks may be applied to different regions on the same side of the identification document. The two regions where each digital watermark has been applied may share a common region. The two digital watermarks may also be applied to the same region on the same side of the identification document. The two digital watermarks may be applied to different grating structures underneath the same page of the identification document such that only one digital watermark is detectable from a given viewing angle or a particular viewing direction. In other words, detection of the given digital watermark may be viewing-angle dependent or viewing-direction dependent.

The first digital watermark with luminance modulations and the second digital watermark with chrominance modulations may encode a common piece of information based on which the two digital watermarks may mutually authenticate each other. The process may be known as a cross-correlation. To cross-correlate the information encoded by the two digital watermarks, a correlatable portion of information may be determined for the correlation purpose. The determination may take place when the digital watermarks are being applied to the identification document. The digital watermarks on an identification document may encode information identifying the issuing entity, such as, for example, the DMV, the state department, the employer. The digital watermarks on an identification document may encode personally identifiable information about the holder of the identification document. As discussed above, personally identifiable information may include name (including full name, first name, last name, middle/initials), date of birth, height, weight, residential address, gender, nationality, occupation, marital status, eye color, hair color, blood type election zone, document number, issue date, etc.

Figure 2B:
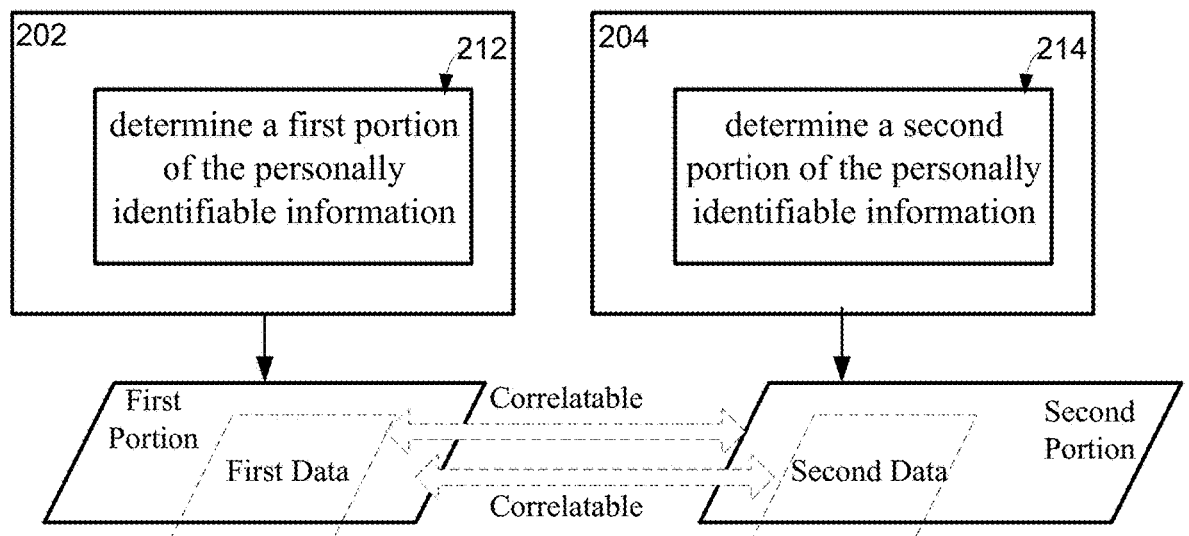
FIG. 2B is a flow chart showing an example of a method for determining correlatable portions of personally identifiable information for luminance and chrominance modulations according to some implementations.

FIG. 2B is a flow chart showing an example of a method for determining correlatable portions of personally identifiable information for luminance and chrominance modulations according to some implementations. Determining a first portion of personally identifiable information (212) may take place during the stage of modulating the luminance pattern of the first digital watermark (202). The first portion of personally identifiable information may include any portion of personally identifiable information as discussed above. Likewise, determining a second portion of personally identifiable information (214) may take place during the stage of modulating the chrominance distribution of the second digital watermark (204) and the second portion of personally identifiable information may also include any portion of the personally identifiable information as discussed above. Nonetheless, the first portion of personally identifiable information may include first data that is correlatable with second data from the second portion of personally identifiable information. The first data may be identical in contents to the second data. Correlating the first data with the second data may be a comparison of the first data and the second data. The comparison may be a string comparison. The comparison may also be a numerical subtraction. The first data and the second data, once combined, may reveal a piece of personally identifiable information of the holder. For example, the first data may include the odd digits of the birth date while the second data may include the even digits of the birth date. For example, the first data may be the beginning five digits of the holder's social security number while the second data may be the ending four digits of the holder's social security number. Correlating the first data with the second data may be a string combination or concatenation. In some implementations, the correlatable data may be information other than the personally identifiable information of the holder. For example, the correlatable data may be the issuing authority's emblem symbol, acronym of the employer, etc. As discussed above, the first portion and the second portion may be encrypted.

Figure 2C:
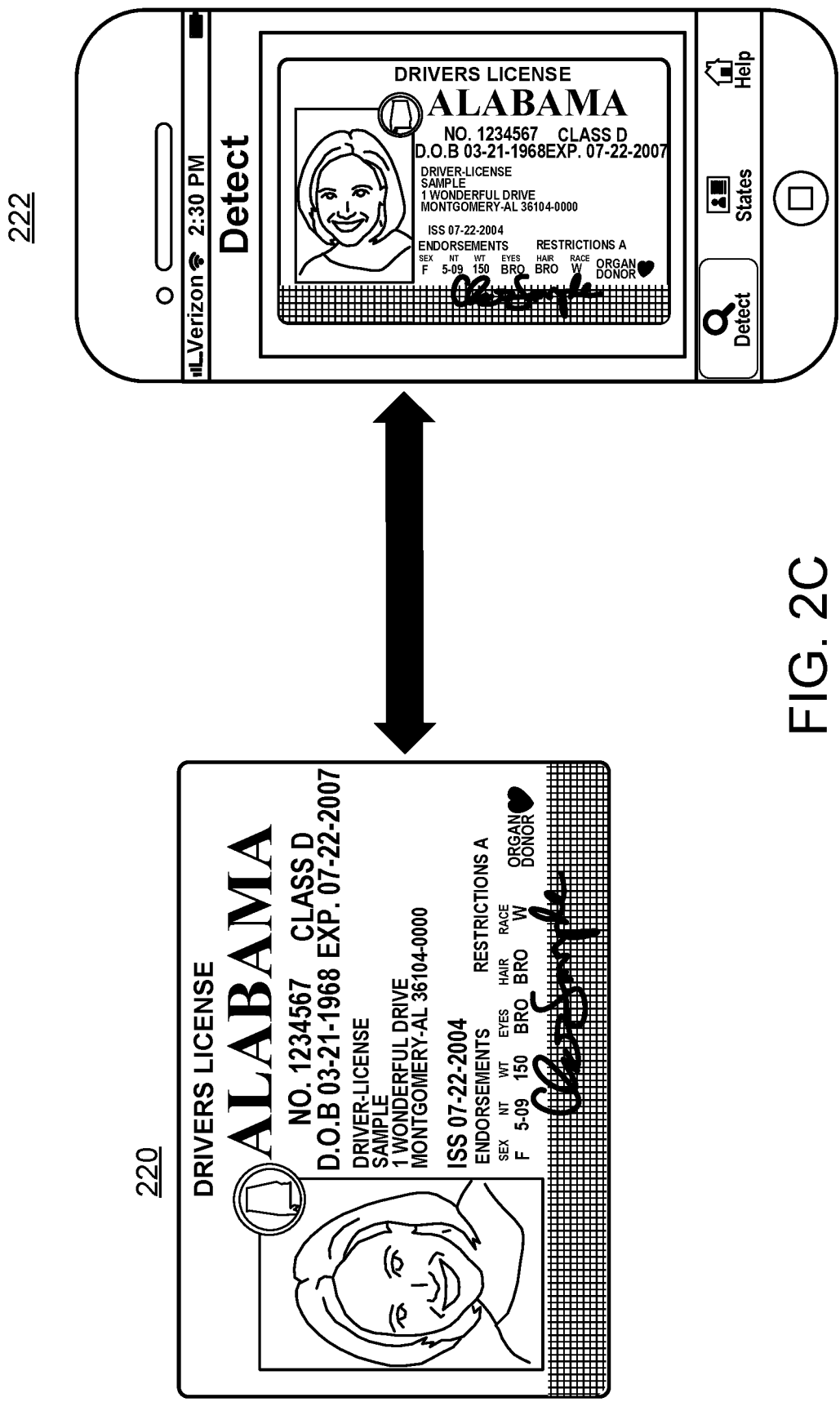
FIG. 2C shows an example identification document digitally watermarked according to some implementations.

The digital watermark with luminance modulation and the digital watermark with chrominance modulation may be applied to the same identification document. The two distinct digital watermarking mechanisms may be applied either a physical identification document or a digital identification document. FIG. 2C shows a physical identification document 220 and a digital identification document 222 displayed on a mobile device.

Figure 3A:
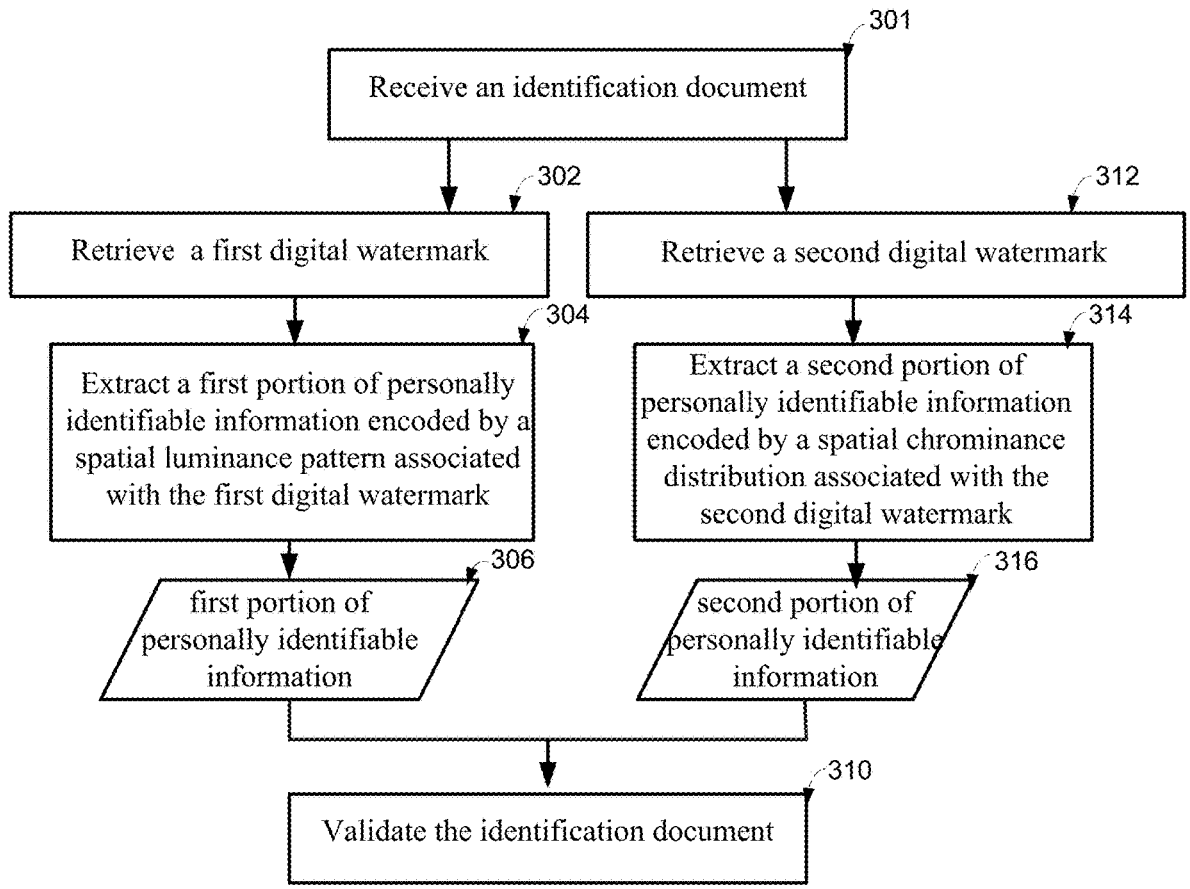
FIG. 3A is a flow chart showing an example method of authenticating an identification document based on the luminance and chrominance modulations of digital watermarks according to some implementations.

To valid the identification document, the two digital watermarks may be analyzed and the information encoded by each digital watermark may be compared against each other. FIG. 3A is a flow chart showing an example method of authenticating an identification document based on the luminance and chrominance modulations of digital watermarks according to some implementations. An identification document may be received (301). The identification document may be digitally watermarked as discussed above. For example, the identification document may include a first digital watermark with a modulated spatial luminance pattern and a second digital watermark with a modulated spatial chrominance distribution. The first digital watermark may be retrieved by a scanning device (302). The scanning device may be configured to read the machine-readable luminance pattern encoding the first portion of personally identifiable information. As a result, the first portion of personally identifiable information 306 may be extracted from the spatial luminance pattern associated with the first digital watermark (304). Likewise, the scanner may retrieve the second digital watermark from the identification document (312). As discussed above, the second digital watermark may include a spatial chrominance distribution to encode a second portion of personally identifiable information. The scanner device may be configured to extract the second portion of personally identifiable information 316 from the spatial chrominance distribution of the second digital watermark (314). When reading out the first portion of personally identifiable information 306 and the second portion of personally identifiable information 316, the scanning device may be configured to extract the encoded information simultaneously. The encoded information may be encrypted, for example, by the private key of the issuing authority. In some implementations, the scanning device may be configured to decrypt the encoded information, for example, by using a public key of the issuing authority. The identification document may be validated based on the first portion of personally identifiable information as well as the second portion of personally identifiable information (310).

Figure 3B:
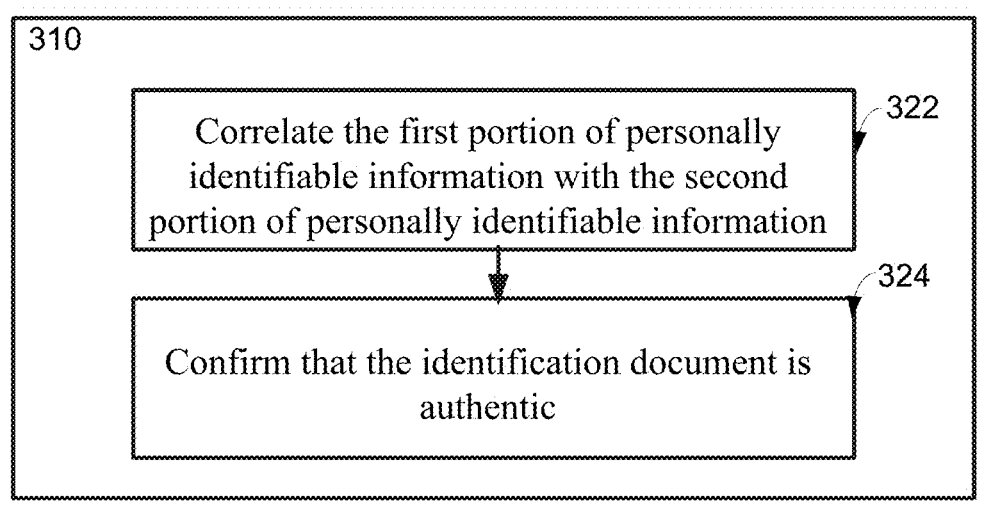
FIG. 3B is a flow chart showing an example method of correlating portions of personally identifiable information according to some implementations.

FIG. 3B is a flow chart showing an example method of correlating portions of personally identifiable information according to some implementations. In validating the identification document (310), the first portion of personally identifiable information may be correlated with the second portion of personally identifiable information (322). The first and second portions of personally identifiable information may include a common piece of information, for example, the holder's birth date. Correlating the first and second portions may include comparing a piece of information meant to be identical in contents and encoded by two independent mechanisms. As discussed above, correlating may also include combining or concatenating pieces of information from the first and second portions. The correlation may yield a matching result indicating a confirmation the identification document is authentic (324).

The match may not be perfect. In some implementations, for example, the frequency domain information encoded by the two digital watermarks may be incomplete due to losses in the scanning process. In some implementations, the degree of match may depend on the context of the application. For example, for applications involving mobile transactions with a financial sum of under $500, a lower degree of match level may be sufficient. While for applications involving accessing high security facilities such as nuclear plant to military installation, a higher degree of match may be adopted. In some implementations, the matching process may depend on jurisdiction. For example, in some states which adopted a less sophisticated digital watermark, a more primitive match procedure may be performed. Even in states that have adopted a more sophisticated digital watermark, a legacy digital identification document may still use the old and less sophisticated digital watermarking. The legacy identification document may still be honored by a more primitive matching procedure. In some implementations, ascertaining whether there is a substantial match may further factor in usage history of the holder of the identification document. For example, if the person requesting access at the building has frequently gained access to the building in the past, then the degree of match may be lessened to simplify the process. In a similar vein, a trusted visitor database can be set up to track such visitors and potentially speed up the validation process.

If substantial match has been found between the encoded data from the first and second portions of identification document, then the authenticity of the identification document may be confirmed (324). Conversely, if substantial match has not been found between the encoded data from the first and second portions of identification document, then the authenticity of the identification document may not be confirmed. In some implementations, the holder of the identification document may be alerted if the authenticity of the identification document cannot be established. The alert may sent through email, automatic voicemail, short message service (SMS) message, etc., to a registered account of the holder of the identification document.

Figure 3C:
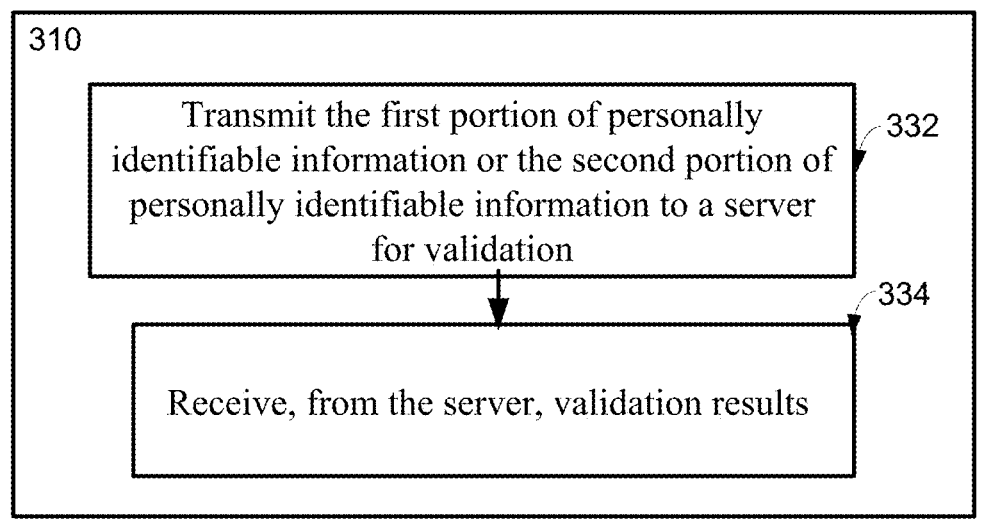
FIG. 3C is a flow chart showing an example method of validating portion(s) of personally identifiable information encoded by a digital watermark according to some implementations.

FIG. 3C is a flow chart showing an example method of validating portion(s) of personally identifiable information encoded by a digital watermark according to some implementations. In some implementations, the scanner device may transmit the decoded first portion of personally identifiable information or the second portion of personally identifiable information to a server for validation (332). The transmitted personally identifiable information may include information not printed on the identification document or information encrypted by the issuing authority of the identification document. The server may be maintained by the issuing authority or a proxy of the issuing authority. If the personally identifiable information received at the server has been encrypted by the issuing authority, the server may first decrypt the received information. The encryption may utilize a public key of the issuing authority and may be decrypted by the corresponding private key of the issuing authority. The encrypted information may also include an integrity check. Example integrity checks may include a check sum, a hash, a cyclic redundancy check (CRC) code, etc.

The server may compare the received personally identifiable information with a record stored in the database. In comparing the received personally identifiable information against the database, the server may implement different levels of matching depending on the context of the application, as discussed above. If an adequate match has been identified, the server may notify the scanning device of the match. If, however, no adequate match can be identified, the server may alert the scanning device of the lack of match. Therefore, the scanning device may receive validation results from the server (334), according to some implementations.

Figure 4A:
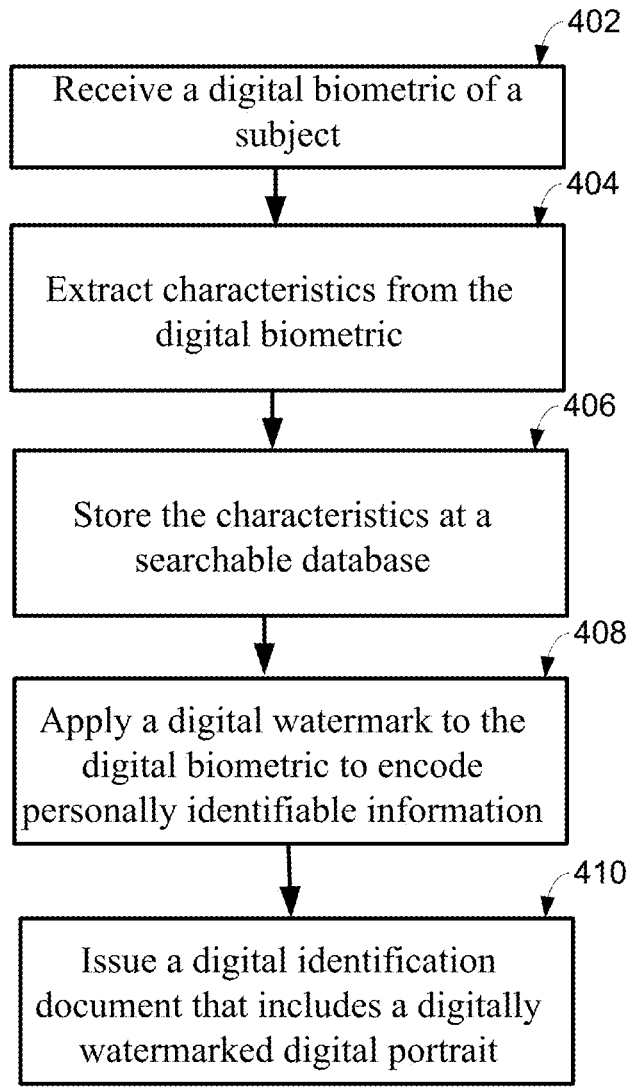
FIG. 4A is a flow chart showing an example method of combining a biometric and a digital watermark on a digital identification document according to some implementations.

In some implementations, the digital watermark(s) may be combined with a digital biometric to provide a digital identification document for secure authentication. FIG. 4A is a flow chart showing an example method of combining a biometric and a digital watermark on a digital identification document according to some implementations. A digital biometric of a subject may be received (402). The digital biometric may be a digital representation of a biometric. The digital representation may be in the form of a binary file stored in a storage device, such as, for example, hard disk drive, non-volatile memory, dynamic random access memory, etc. The biometric may include a facial portrait, a finger-print, a palm-print, a iris pattern, a retina pattern, etc. of a subject. The digital biometric may the biometric encoded in any digital encoding scheme suitable for storage on a computing device having at least one processor. The encoding scheme may account for the underlying processor architecture, for example, big endian or little endian.

Characteristics may be extracted from the digital biometric (404). For example, a facial recognition software may extract facial characteristics from a digital portrait of the subject. In some implementations, an analytical algorithm may extract characteristics from a finger-print, for example, by decomposing the finger-print pattern into principal components (also known as singular value decomposition). In some implementations, an analytic algorithm may extract characteristics from a finger-print based on coefficients from edge preserving transformations such as wavelet transforms, Hough transforms, etc. Similar analytical algorithms may be applied to extract characteristics from a palm-print, an iris pattern, a retina pattern, a pupil pattern, etc.

The extracted characteristics may serve as a compressed representation of the digital biometric. The extracted characteristics may then be stored at a searchable database (406). Using the extracted characteristics, rather than the full digital biometric may reduce storage space requirement or enhance search speed. In some implementations, the extracted characteristics may be stored at a central server managed by the entity issuing the identification document. In some implementations, a copy of the extracted characteristics may be stored on a mobile device of the subject, i.e., the person from whom the digital biometric was taken.

Next, a digital watermark may be applied to the digital biometric of the subject (408). In some implementations, the digital watermark may be applied to an area other than the digital biometric on the digital identification document. The digital watermark may be applied to encode any number, letter, or symbology in accordance with the description herein. In some implementations, digital watermarks including both luminance and chrominance modulations may be applied, as described above. In some implementations, the encoded information may be encrypted, as disclosed above. In some implementations, the digital watermarks may encode personally identifiable information of the subject. As discussed herein, the personally identifiable information may include name (including full name, first name, last name, middle/initials), date of birth, height, weight, residential address, gender, nationality, occupation, marital status, eye color, hair color, blood type election zone, document number, issue date, etc. In some implementations, the digital watermarks may encode information indicating the source or the issuing entity of the digital identification document.

Thereafter, a digital identification document may be issued (410). The digital identification document may include both the digital biometric and the digital watermark. In some implementations, the digital identification document may include a digitally watermarked digital biometric. The digital identification document may be issued to a mobile device of the subject. Example mobile devices may include smart phones, such as, for example, an iPhone, a Samsung smart phone, a HTC smart phone, an Android smart phone, a Windows smart phone, etc. In addition, mobile device may include a tablet device, for example, an iPad, a Samsung Note device, a Microsoft touch device, etc. Further, mobile device may also include a laptop device, or even a desktop computer at home. The digital identification document may be issued in the form of a digital file stored on the mobile device.

Figure 4B:
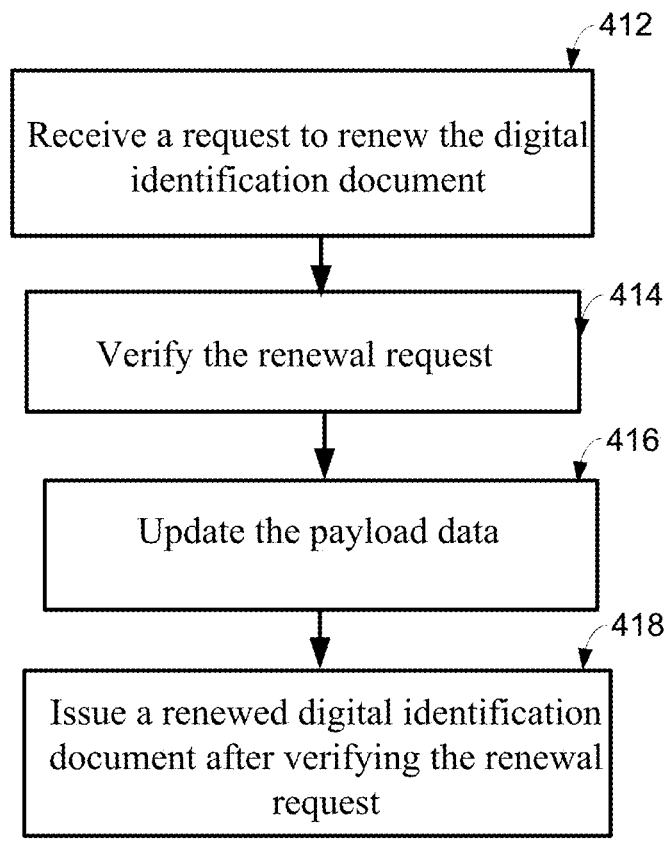
FIG. 4B is a flow chart showing an example process of renewing a digital identification document according to some implementations.

A digital identification document can lead to increased ease in document renewal or replacement. FIG. 4B is a flow chart showing an example process of renewing a digital identification document according to some implementations. A request to renew the digital identification document may be received (412). The request may be received on-line by a server at the issuing entity. The server may verify the renewal request (414). For example, the server may check the source of the renewal request to confirm the validity of the request. The source may refer to the originating device, for example, the subject's mobile device. The source device may be verified based on a secured identifier associated with the mobile device. The source may also refer to the requestor who submitted the renewal request. The requestor may submit the request through an on-line account and therefore may be verified according to the user authentication protocol for accessing the on-line account. In submitting the renewal request, the subject may update some personally identifiable information, such as, for example, marital status, occupation, residential address, etc. The subject may also submit a more recent biometric, such as, for example, a more recent facial portrait. After receiving the updated personally identifiable information, the server may update payload data associated with the digital watermark accordingly (416). As discussed above, the payload data may encode a portion of the personally identifiable information of the subject. Thereafter, the server may issue a renewed identification document (418). The renewed identification document may be issued to the subject's mobile device for display in the same manner as described above. The renewed identification document may be issued with a new expiration date later than the old expiration date on the replaced identification document. In some implementations, the renewed digital identification document may incorporate updated information other than personally identifiable information. Examples may include donor consent information. In issuing the renewed digital identification document, neither a physical trip to the issuing entity nor a physical copy may be required.

Figure 4C:
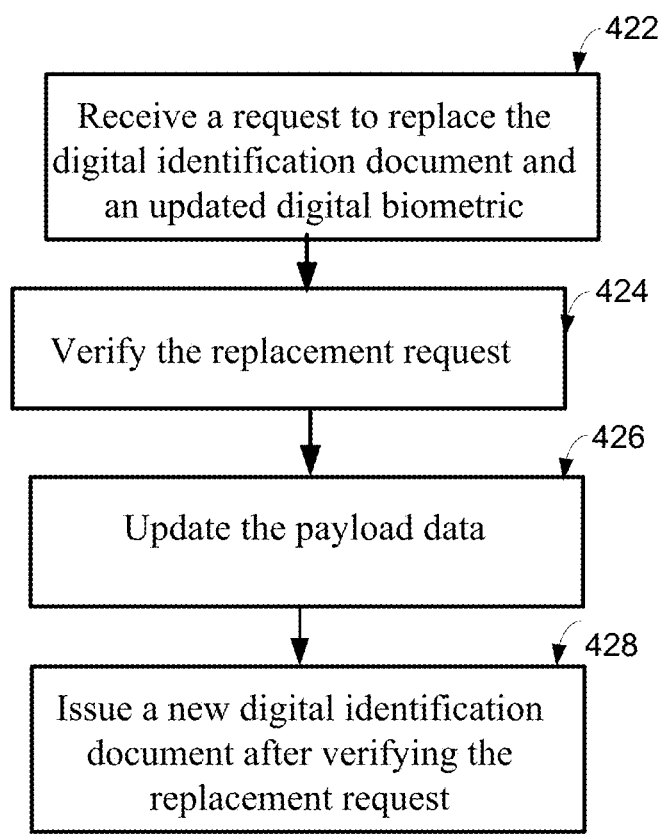
FIG. 4C is a flow chart showing an example process of replacing a digital identification document according to some implementations.

Similar ease may be observed in the replacement process (for example, when the subject lost the digital identification document due to storage failure). FIG. 4C is a flow chart showing an example process of replacing a digital identification document according to some implementations. A request to replace the digital identification document may be received (422). The request may be received on-line by a server at the issuing entity. The server may verify the replacement request (424) by means similar to the descriptions above. The replacement request may update the personally identifiable information of the subject which may cause the server to update the payload data associated with the digital watermark to be applied (426). Thereafter, the replacement digital identification document may be issued (428) in accordance with the descriptions herein. In some implementations, the identification document may be issued with a version number to distinguish from the replaced identification document. The version number may be tracked by the server in future administrations. In some implementations, the renewed digital identification document may incorporate updated information other than personally identifiable information. Examples may include donor consent information. Similar to the disposition of a renewal request, neither a physical trip to the issuing entity nor a physical copy may be required.

Likewise, revocation or suspension of a digital identification document may be accomplished without a physical trip to the issuing entity or the destruction of a physical document. In some implementations, a revocation request may be submitted on-line to a server at the issuing entity. After verifying the revocation request, the server may revoke the digital identification document by removing the digital identification document from the storage medium on the mobile device of the document holder. In some implementations, the server may issue a revoked digital identification document to over-write the original digital identification document. In so doing, the server may keep a version number of the digital identification document issued. The version number may be checked when the holder attempts to validate the digital identification document on the holder's mobile device.

Figure 4D:
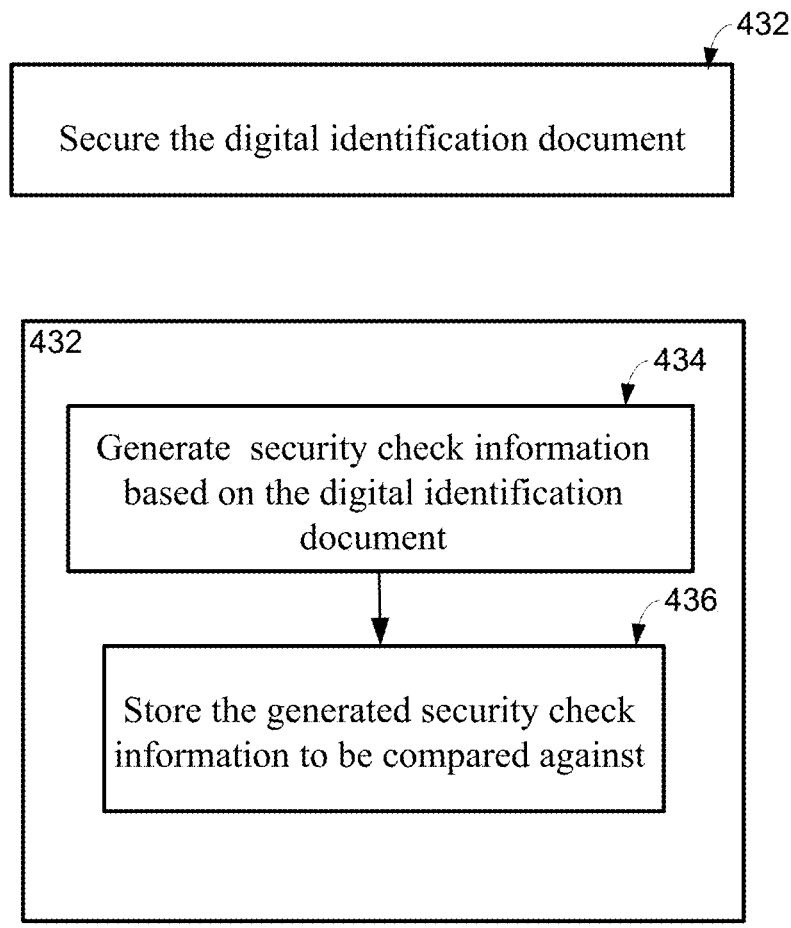
FIG. 4D is a flow chart showing an example method of securing the digital identification document according to some implementations.

FIG. 4D is a flow chart showing an example method of securing the digital identification document according to some implementations. In addition to encryption, the integrity of the digital identification document may be secured (432), for example, by security check information embedded into the digital identification document. The embedded security check information may be encrypted as described above. In particular, the integrity check information may be embedded into the digital identification document based on which alterations of the digital identification document can be detected. For example, security check information may be generated based on the contents of the digital identification document (434). Such security check information may include but may not be limited to a check sum, a hash, a cyclic redundancy check (CRC) code, etc. The security check information may be stored for comparison. In some implementations, the security check information may be stored on a server at the issuing entity. In some implementations, the security check information may be stored on the mobile device. The stored copy may be compared against at the time of service.

Figure 4E:
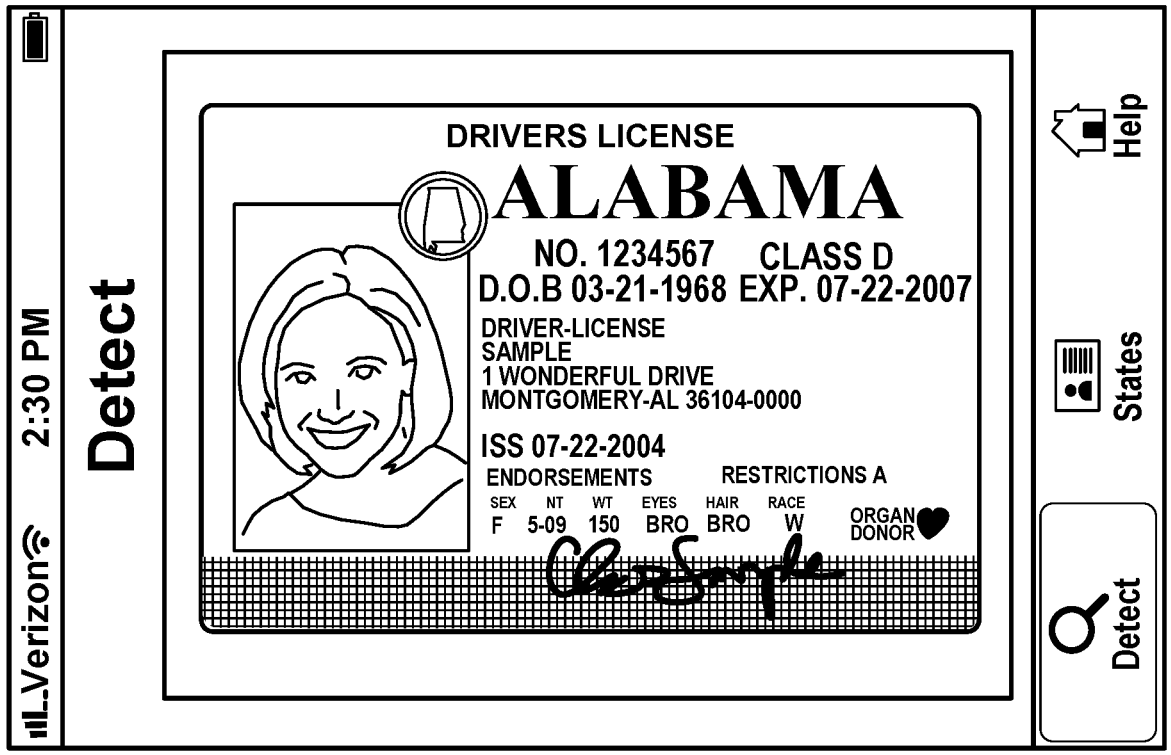
FIG. 4E shows an example digital identification document displayed on a mobile device according to some implementations.

FIG. 4E shows a digital identification document 440 according to some implementations. Digital identification document 440 may be displayed on, for example, the touch screen of a smartphone. The size of the displayed digital identification document may be mimic the size of a physical identification document. For example, a driver's license may be of the dimension of ID-1. ISO/IEC 7810 standard for ID-1 is nominally 85.60 by 53.98 millimeters (3.370 in×2.125 in), which is about the size of a credit card. The display may be implemented by a custom application capable of handling the file format of the digital identification document. The custom application may prevent screen capture programs from saving the screen display to generate a screen copy of the digital identification document. In some implementations, the digital identification document may only be viewable from the custom application on the subject's mobile device. For example, the digital identification document may be encrypted by a public key of the mobile device of the subject. The corresponding private key may be tied to the mobile device and accessible only from the mobile device. As a result, only the subject's mobile device may be capable of displaying the digital identification document to a human inspector. The digital identification document may be encrypted using the issuing entity's private key and the custom software may be configured to decrypt only with the issuer's public key.

Figure 5A:
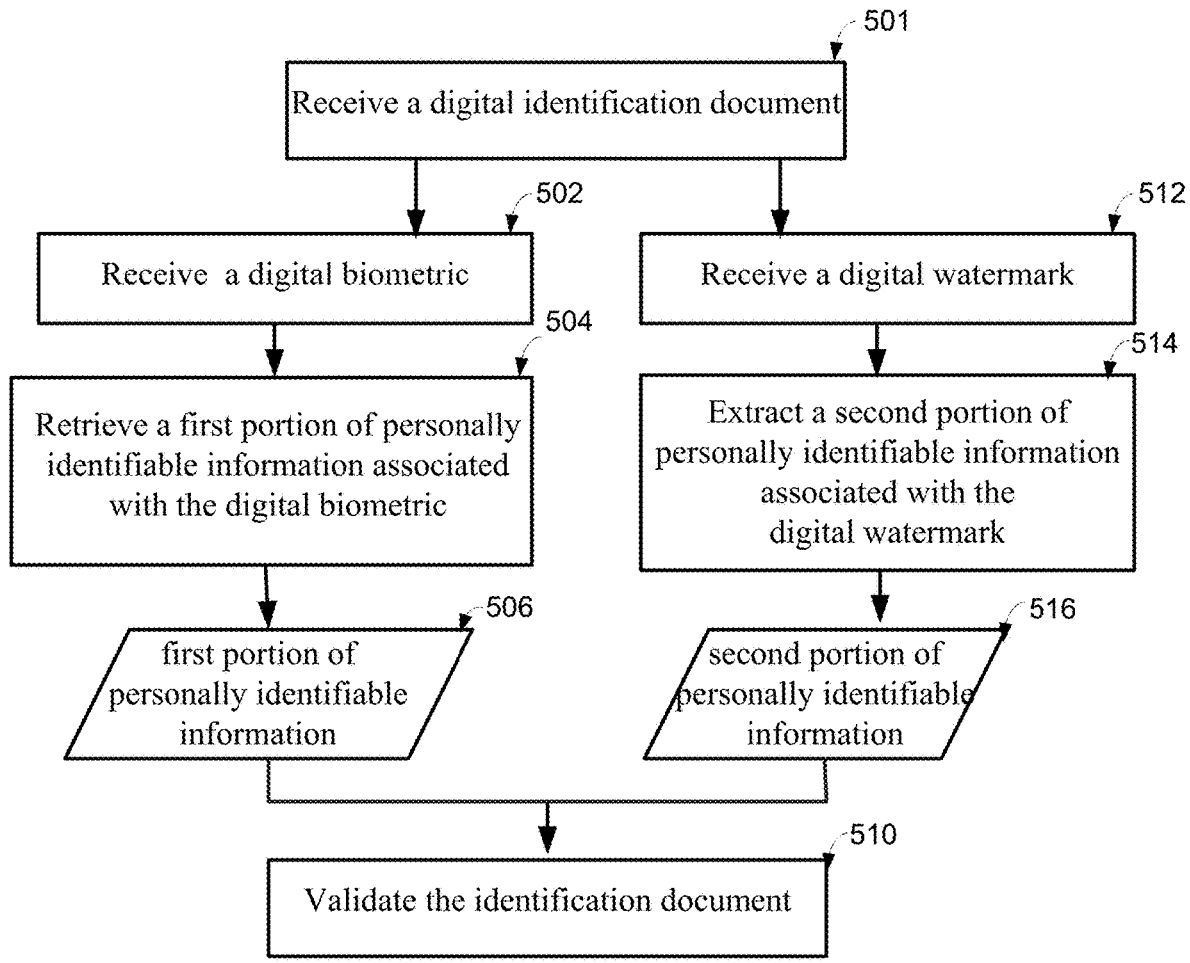
FIG. 5A is a flow chart showing an example method of validating the digital identification document according to some implementations.

FIG. 5A is a flow chart showing an example method of validating the digital identification document according to some implementations. The validation may be performed at a point of service. A point of service may refer to a point of sale, when the holder of the identification document attempts to buy or sell a merchandise. A point of server may generally refer to a point of transaction, when the holder of the identification document attempts to access an account, obtain entry into a facility, or any type of transaction for which a proof of identity may be required. At a point of service, when the holder of the digital identification document presents the digital identification document to prove his/her identity, the holder may present the touch screen of a mobile device to a human inspector. The human inspector may compare the displayed portrait against the presenter. If the displayed portrait does not match the presenter, the human inspector may reject any identity claim made by the presenter. In some implementations, if the human inspector determines that the displayed portrait matches the presenter, the human inspector may defer further processing to a reading device. In some implementations, the entire inspection may be performed by a reading device. The reading device may be any computing device with a processor and a transceiver as a data communications interface. To begin with, data encoding the digital identification document may be received by a reading device (501). The reading device may receive the digital identification document by scanning the touch screen of a mobile device. The reading device may receive the digital identification document via a communication link so that data encoding the digital identification document may be transmitted to the reading device, while a human inspector may inspect the digital identification document. The transmission of the data encoding the digital identification document may be wireless. In other words, the digital identification document may be beamed to the reading device.

Figure 5B:
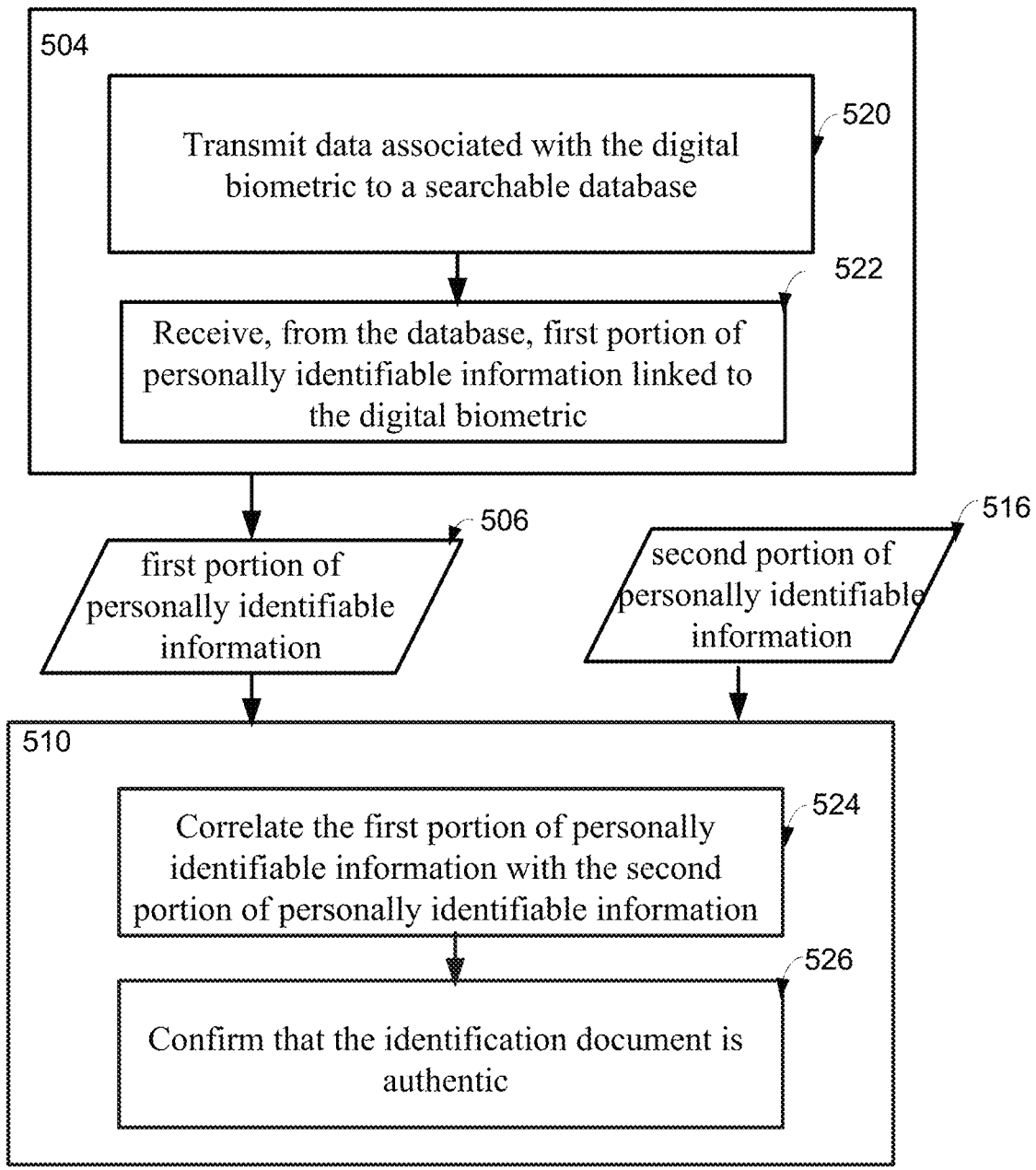
FIG. 5B is a flow chart showing an example process of validating the digital identification document according to some implementations.

Once the reading device receives the digital identification document, both the digital biometric (502) and the digital watermark (512) may be received at the reading device. The reading device may retrieve a first portion of personally identifiable information associated with the digital biometric (504). In some implementations, characteristics may be extracted from the digital biometric. As described above, these characteristics may include, for example, principal component values from a singular value decomposition, wavelet coefficients from a wavelet transform, etc. In some implementations, the extracted characteristics may be generated by facial recognition software on the reading device. In some implementations, the extracted characteristics may be compared against a searchable database at the point of service. In some implementations, the extracted characteristics may be transmitted to a central server. Referring to FIG. 5B, data encoding the extracted characteristics may be transmitted to a searchable database on the central server for comparison (520). If the search yields a match, then the corresponding personally identifiable information of the holder of the digital identification document may be retrieved. As discussed above, when issuing the digital identification document, a portion of the personally identifiable information associated with holder of the digital identification document may be stored on a searchable database of the issuing entity. The portion of the personally identifiable information stored at the server may be referred to as the first portion of the personally identifiable information. The server at the issuing entity may transmit the first portion of personally identifiable information back to the reading device. Thus, the first portion of personally identifiable information may be received at the point of service (522). As discussed above, the characteristics of the digital biometric may be a compact representation of the digital biometric and the overhead of storage or communication to the server may be reduced.

Returning to FIG. 5A, a second portion of personally identifiable information 516 associated with the second digital watermark may be extracted (514). The extraction may be performed by the reading device on the digital identification document. Thereafter, the validity of the digital identification document may be confirmed based on the first portion of personally identifiable information 506 with the second portion of personally identifiable information 516 (510). Referring to FIG. 5B, the reading device may correlate the first portion of personally identifiable information 506 with the second portion of personally identifiable information 516 (524). In some implementations, the first and second portions of personally identifiable information may include a common piece of information, for example, the holder's birth date. Correlating the first and second portions may include comparing a piece of information meant to be identical in contents albeit encoded by two independent mechanisms. In addition, the two portions of personally identifiable information may be stored and retrieved separately. The introduced redundancy may further enhance confidence in validity determination. In some implementations, correlating may also include combining or concatenating pieces of information from the first and second portions. The correlation may yield a matching result confirming that the digital identification document is authentic (526). As discussed above, the match may not be perfect and may depend on the quality of the scanned image of the digital identification document, the context of the application, the sophistication of digital watermarking at a particular jurisdiction, or prior dealings of the holder of the digital identification document.

Figure 5C:
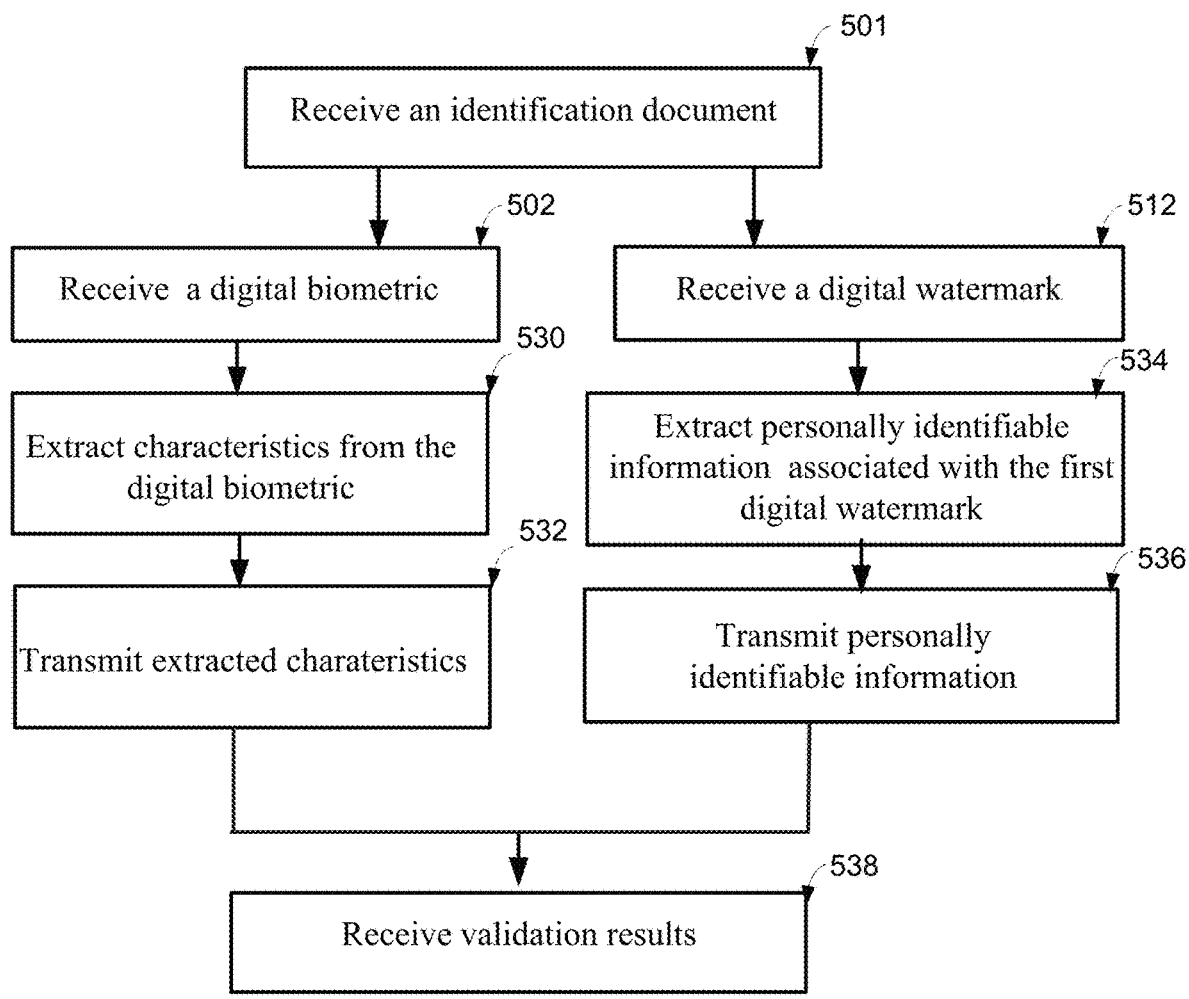
FIG. 5C is a flow chart showing an example method of validating the digital identification document according to some implementations.

FIG. 5C is a flow chart showing an example method of validating the digital identification document according to some implementations. In some implementations, once the digital biometric is received at the reading device, the characteristics of the digital biometric may be extracted (530) and then transmitted to a server at the issuing entity (532). Likewise, once the digital watermark has been received at the reading device, the encoded personally identifiable information may be extracted by the reading device (534). In accordance with the discussions above, the extracted personally identifiable information may be referred to as the second portion of personally identifiable information. The reading device may transmit the second portion of the personally identifiable information to the server (536). The server may be then validate the digital identification document. For example, the server may retrieve the first portion of personally identifiable information by searching the extracted characteristics against records in the searchable database. As discussed above, a matching record may reveal the first portion of the personally identifiable information. The server may then correlate the two portions of personally identifiable information to validate the digital identification document. The reading device may receive the validation results (538) and then notify the human inspector at the point of service. The notification may include a visual display of a textual message, an iconic message on a graphic display, a voice message, etc.

Figure 6A:
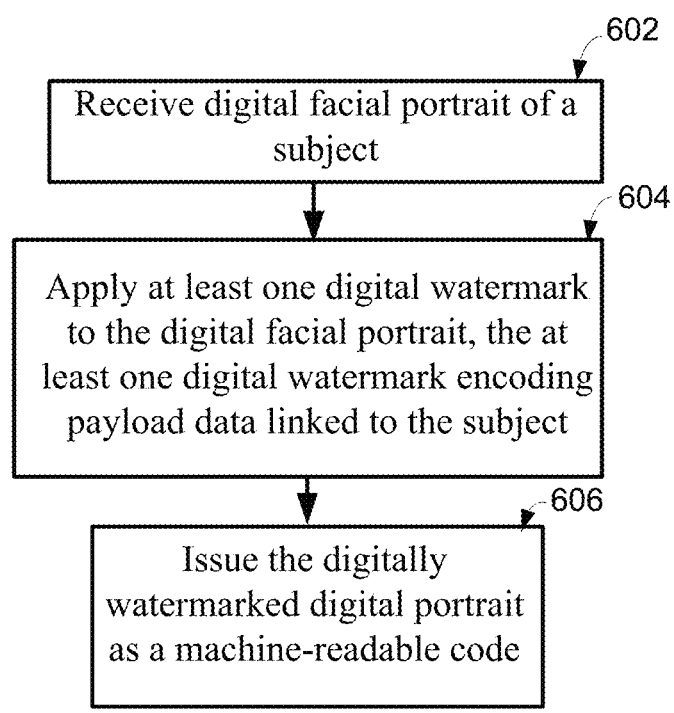
FIG. 6A is a flow chart showing an example method of digitally watermarking a digital portrait as a machine-readable code according to some implementations.

To prove identity at a point of service, a digitally watermarked portrait may be used a personalized QR code in some implementations. FIG. 6A is a flow chart showing an example method of digitally watermarking a digital portrait as a machine-readable code according to some implementations. A digital facial portrait of a subject may be received at a server of an issuing entity (602). The digital facial portrait may be digitally stored on a storage device on the server. The facial portrait may be taken from the subject at any locations and may not be limited to studios or DMV offices. The digital facial portrait may have a virtual backdrop that replaces the actual backdrop. The digital portrait may comply with existing standards on biometrics, such as, for example, the International Civil Aviation Organization (ICAO) standard. The digital portrait may also comply with other standards under development.

Thereafter, at least one digital watermark may be applied to the digital facial portrait of the subject (408). The applied digital watermark may identify payload data associated with the subject. In some implementations, a digital watermark may be applied to carry payload data encoding a portion of personally identifiable information of the subject. For example, the digital watermark may include modulated Moire's pattern to carry the payload data. In some implementations, the digital watermark may be linked to personally identifiable information. For example, the digital watermark may include symbology marks identifying the subject being portrayed. In some implementations, digital watermarks including both luminance and chrominance modulations may be applied, as described above. In some implementations, the encoded information may be encrypted, as disclosed above. As discussed herein, the personally identifiable information may include name (including full name, first name, last name, middle/initials), date of birth, height, weight, residential address, gender, nationality, occupation, marital status, eye color, hair color, blood type election zone, document number, issue date, etc. In some implementations, the digital watermarks may encode information indicating the source or the issuing entity of the digital identification document.

Subsequently, the digitally watermarked digital portrait may be issued as a machine-readable code (606). In some implementations, the digitally watermarked digital portrait may be issued to a mobile device of the subject, for example, in the form of a digital file stored on the mobile device, as discussed above.

Figure 6B:
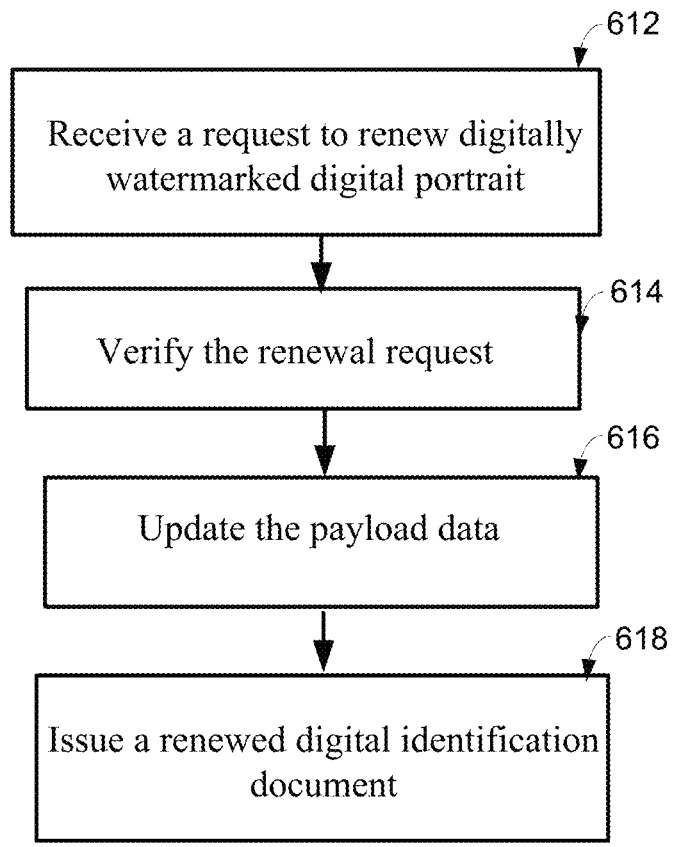
FIG. 6B is a flow chart showing an example process of renewing a digitally watermarked digital portrait according to some implementations.

The digitally watermarked digital portrait may lead to increased ease in document management. FIG. 6B is a flow chart showing an example process of renewing a digitally watermarked digital portrait according to some implementations. A request to renew the digitally watermarked digital portrait may be received (612). The renewal request may be received at the server of the issuing entity. The renewal request may be verified (614). For example, the server may check the source of the renewal request to confirm the validity of the request. The source may refer to the originating device, for example, the subject's mobile device. The source device may be verified based on a secured identifier associated with the mobile device. The source may also refer to the requestor who submitted the renewal request. The requestor may submit the request through an on-line account and therefore may be verified according to the user authentication protocol for accessing the on-line account. In submitting the renewal request, the subject may update some personally identifiable information, such as, for example, marital status, occupation, residential address, etc. The subject may also submit a more recent facial portrait. After receiving the updated personally identifiable information, the server may update payload data associated with the digital watermark accordingly (616). As discussed above, the payload data may encode a portion of the personally identifiable information of the subject. Thereafter, the server may issue a renewed digitally watermarked digital portrait (618). The renewed digitally watermarked digital portrait may be issued to the subject's mobile device for display in the same manner as described above. The renewed digitally watermarked digital portrait may be issued with a new expiration date later than the old expiration date of the replaced digitally watermarked digital portrait. In issuing the renewed digitally watermarked digital portrait, neither a physical trip to the issuing entity nor a physical copy may be required.

Figure 6C:
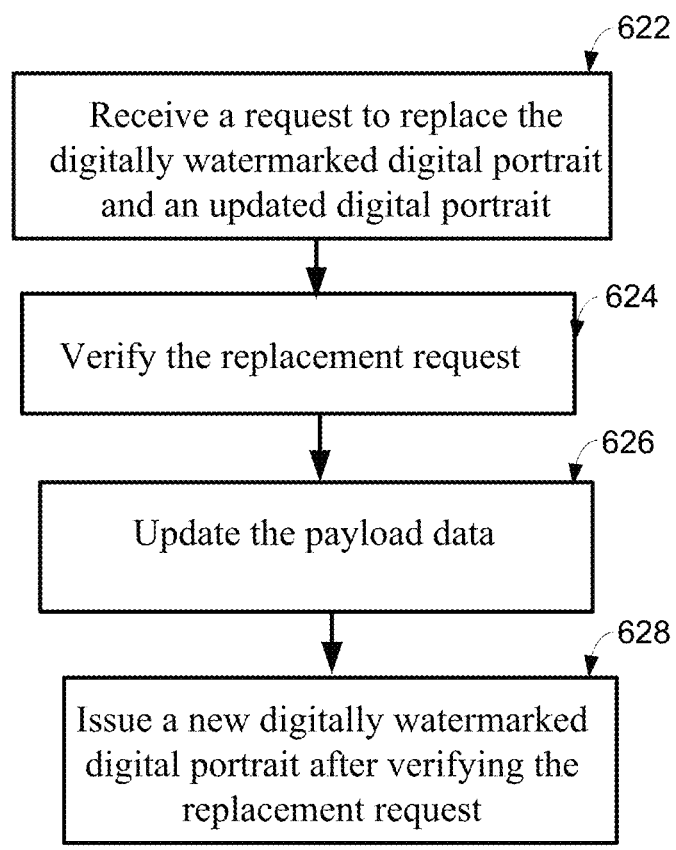
FIG. 6C is a flow chart showing an example process of replacing a digitally watermarked digital portrait according to some implementations.

Similar ease may be observed in the replacement process of the digitally watermarked digital portrait. FIG. 6C is a flow chart showing an example process of replacing a digitally watermarked digital portrait according to some implementations. A request to replace the digitally watermarked digital portrait may be received (622). The request may be received on-line by a server at the issuing entity. The server may verify the replacement request (424) by means similar to the descriptions above. The replacement request may update the personally identifiable information of the subject which may cause the server to update the payload data associated with the digital watermark to be applied (626). Thereafter, the replacement digitally watermarked digital portrait may be issued (428) in accordance with the descriptions herein. In some implementations, the digitally watermarked digital portrait may be issued with a version number to distinguish from the replaced digitally watermarked digital portrait. The version number may be tracked by the server in future administrations. Similar to the disposition of a renewal request, neither a physical trip to the issuing entity nor a physical copy may be required.

Figure 6D:
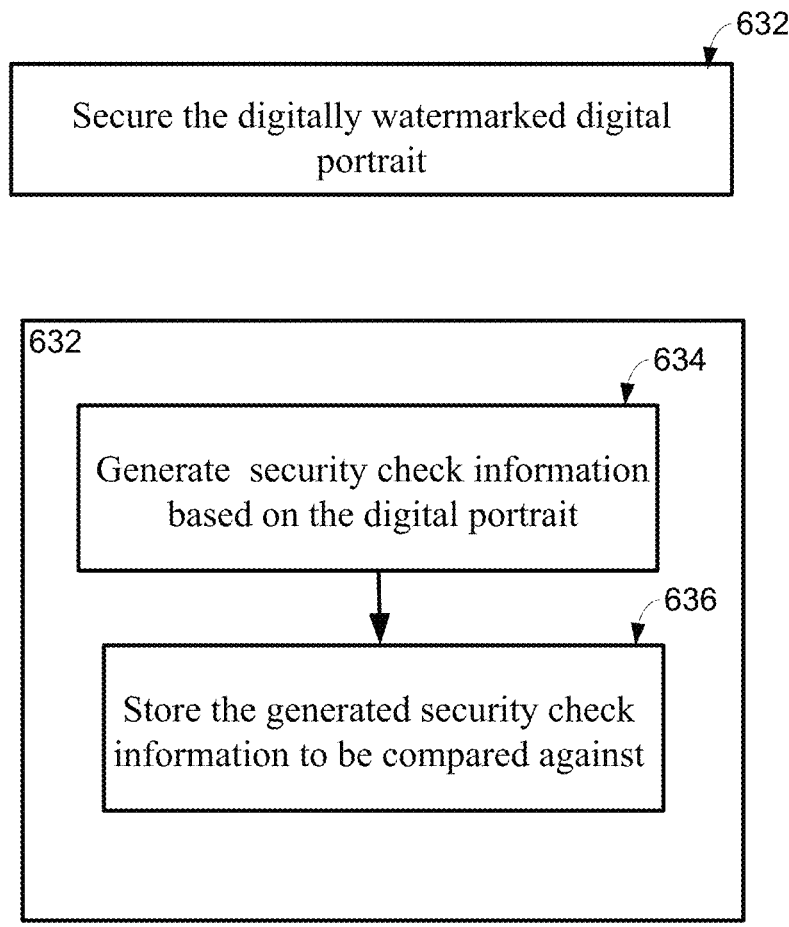
FIG. 6D is a flow chart showing an example method of securing a digitally watermarked digital portrait according to some implementations.

FIG. 6D is a flow chart showing an example method of securing a digitally watermarked digital portrait according to some implementations. In addition to encryption, the integrity of the digitally watermarked digital portrait may be secured (632), for example, based on security check information embedded into the digitally watermarked digital portrait. In particular, the integrity check information may be embedded into the digitally watermarked digital portrait based on which alterations of the digitally watermarked digital portrait can be detected. For example, security check information may be generated based on the contents of the digitally watermarked digital portrait (434). Such security check information may include but may not be limited to a check sum, a hash, a cyclic redundancy check (CRC) code, etc. The generated security check information may be stored for comparison. In some implementations, the security check information may be stored on a server at the issuing entity. In some implementations, the security check information may be stored on the mobile device. The stored copy may be compared against at the time of service.

Figure 6E:
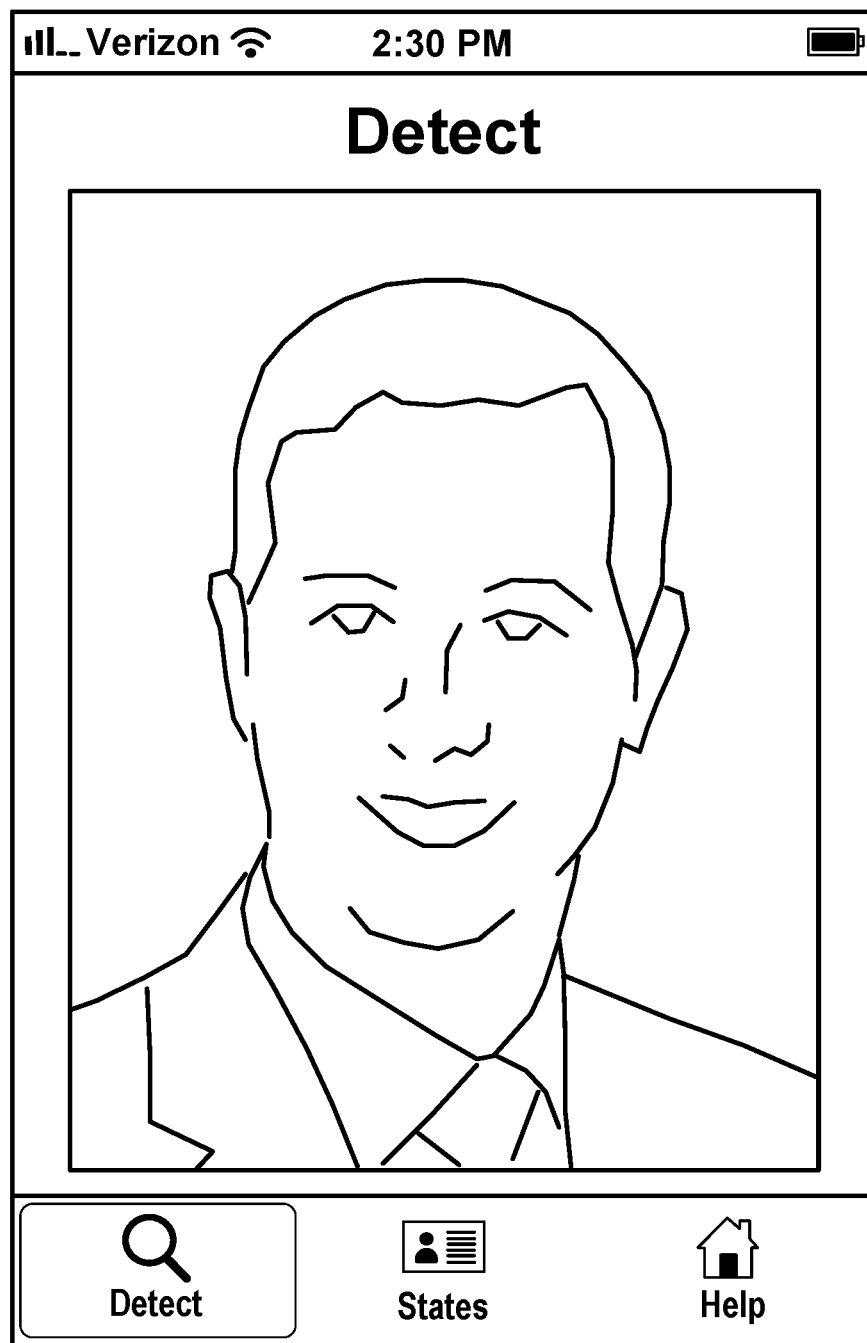
FIG. 6E shows an example digitally watermarked digital portrait displayed on a mobile device according to some implementations.

The digitally watermarked digital portrait may be displayed on, for example, a touch screen of the mobile device. FIG. 6E shows an example digitally watermarked digital portrait 640 displayed on the touch screen of a mobile device. The display may be managed by a custom application program on the mobile device with any of the security features described herein.

Figure 7A:
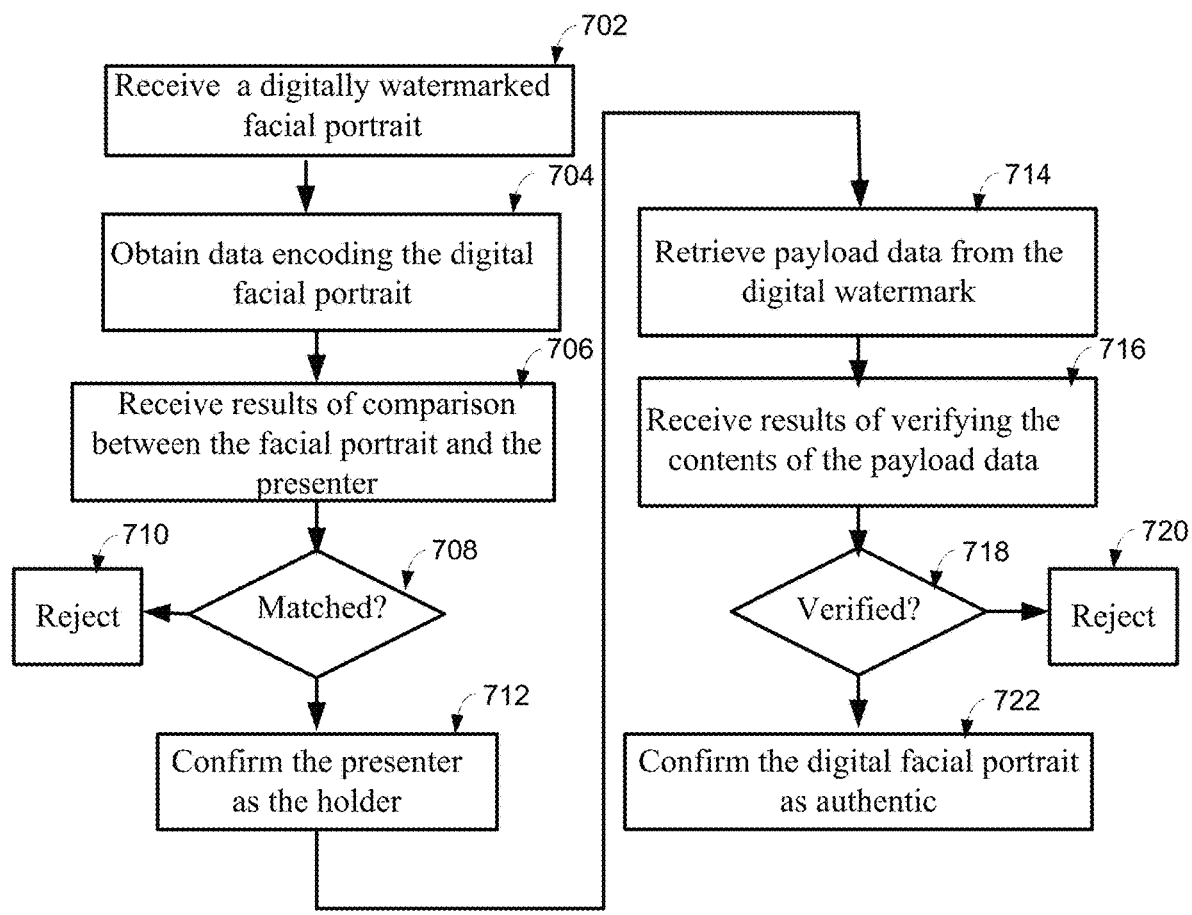
FIG. 7A is a flow chart showing an example method of validating the digitally watermarked digital portrait according to some implementations.

FIG. 7A is a flow chart showing an example method of validating the digitally watermarked digital portrait according to some implementations. As discussed above, the validation may be performed at a point of service. At a point of service, when the person presents the digitally watermarked digital portrait to prove his/her identity, the person may present the touch screen of a mobile device to a human inspector. The human inspector may compare the displayed portrait against the presenter. If the displayed portrait does not match the presenter, the human inspector may reject any identity claim made by the presenter. In some implementations, if the human inspector determines that the displayed portrait matches the presenter, the human inspector may defer further processing to a reading device.

In some implementations, the entire inspection may be performed by a reading device. The reading device may be any computing device with a processor and a transceiver as a data communications interface. The digitally watermarked digital portrait may be received at a reading device (702). For example, the reading device may receive the digitally watermarked digital portrait by scanning the touch screen of a mobile device. The reading device may receive the digitally watermarked digital portrait via a communication link so that data encoding the digitally watermarked digital portrait may be transmitted to the reading device. The transmission of the data encoding the digital identification document may be wireless. In other words, the digital identification document may be beamed to the reading device. Thus, the reading device may obtain data encoding the digitally watermarked digital portrait (704). In some implementations, the reading device may be configured to take a photo portrait of the presenter and then automatically compare the photo portrait with the digital portrait using facial recognition. The reading device may then receive results of comparison between the digital facial portrait and the presenter (706). The results may indicate whether the digital facial portrait matches the presenter (708). If the digital facial portrait does not match the presenter, the reading device may provide instructions to the human inspector to reject all identity claims by the presenter (710). If the digital facial portrait matches the presenter, the reading device may then confirm the presenter as the holder of the digitally watermarked digital portrait (712).

The reading device may then retrieve payload data from the digital watermark (714) in accordance with descriptions herein. The reading device may then receive results of verifying the contents of the payload data (716). As discussed above, the verification may include correlating two portions of personally identifiable information encoded by respective digital watermarks. The respective digital watermarks may incorporate separate modulation mechanism including luminance and chrominance. In some implementations, the verification may include correlating the personally identifiable information extracted from the digital watermark with records at a searchable database on a server.

Figure 7B:
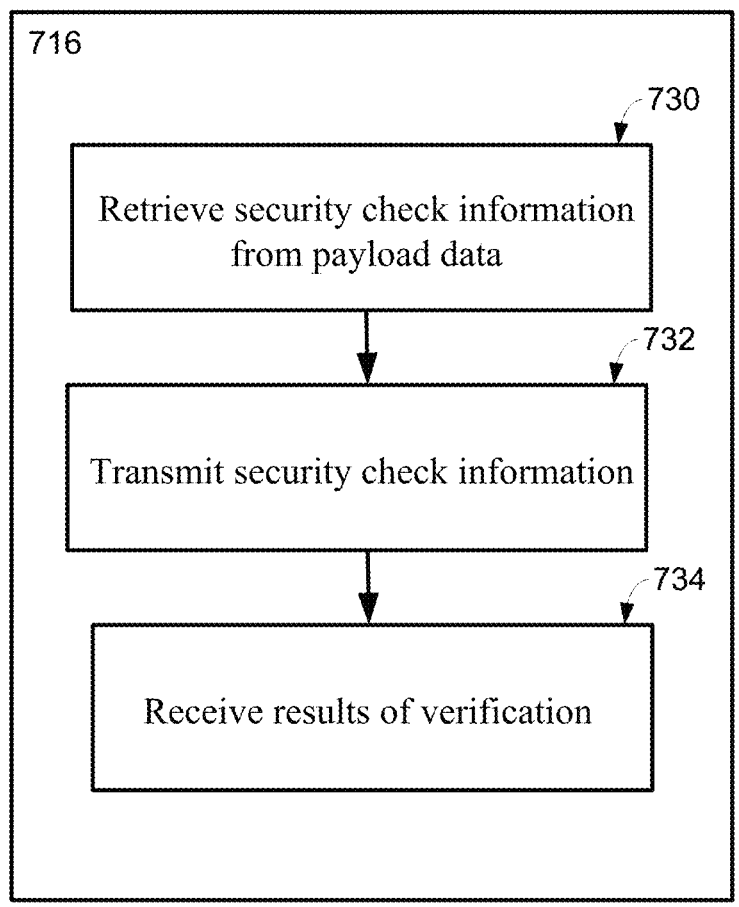
FIG. 7B is a flow chart showing an example process of authenticating the digital watermarked digital portrait.

Referring to FIG. 7B, in some implementations, the reading device may retrieve security check information from payload data of the digital watermark (730). As discussed above, the security check information may be generated at the time of issuance. For example, the security check information may capture a summary information of the digital portrait or personally identifiable information of the holder. The security check information may be a checksum, a hash, or any redundancy checking code. The retrieved security check information may be compared against the same summary information obtained from the digital portrait. In some implementations, the security check information may be transmitted to the server at the issuing entity for comparison (732). The server may compare the security check information with the summary information obtainable from the records at the server. As the discussed above, the correlation may not be a perfect correlation. Instead, the quality of the correlation may depend on the context of the application, sophistication of the issuing authority, and prior dealings of the holder. Thereafter, the reading device may receive results of the verification from the server (734).

Returning to FIG. 7A, the results of correlation may indicate whether the contents of the payload data are verified. If the contents of the payload data are not verified, the reading device may prompt the human inspector to reject all identity claims by the presenter (720). If the contents of the payload data are verified, the reader device may indicate to the human inspector that the authenticity of the digitally watermarked digital portrait has been confirmed (722).

Figure 8:
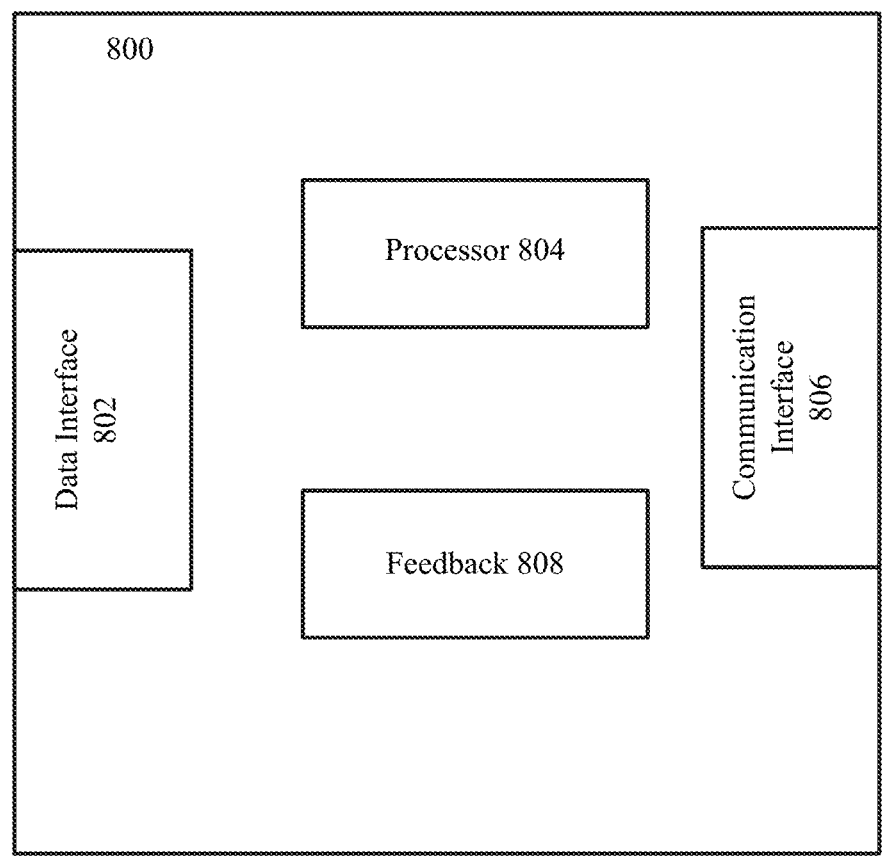
FIG. 8 is a diagram showing an example reading device for validating an identification document according to some implementations.

FIG. 8 is a diagram showing an example reading device 800 for validating an identification document according to some implementations. Reading device may be configured to read any of the identification document or digital portrait watermarked in accordance with the description herein. Reading device 800 may include data interface 802 to read in data. For example, data interface 802 may include a scanning device to scan an identification document presented, a digital identification document displayed on the touch screen of a mobile device, a digital portrait displayed on the touch screen of a mobile device. In some implementations, data interface 802 may read data from a physical identification document, for example, a magnetic stripe, a chip, etc. on the identification document. In some implementations, data interface 802 may establish a wireless link with a mobile device of the presenter of a digital identification document or digital portrait. Data interface 802 may then receive data encoding the digital identification document or the digital portrait through the wireless link. The wireless link may utilize any region on the electromagnetic spectrum, including the infrared band.

Reading device may include processor 804 configured to validate the identification document or the digital portrait in accordance with the descriptions above. For example, processor 804 may be configured to implement facial recognition algorithms to extract characteristics from the portrait on the identification document. Processor 804 may be configured to implement feature recognition algorithms to extract characteristics from other biometrics such as finger-prints, iris patterns etc. In some implementations, processor 804 may be configured to retrieve personally identifiable information from the payload data associated with the digital watermarks. As discussed above, processor 804 may be configured to validate an identification document based on portions of personally identifiable information identified by respective digital watermarks using separate mechanisms.

Reading device 800 may include communication interface 806 configured to transmit data to a server at the issuing entity. The data may include the extracted characteristics or the retrieved personally identification document. As discussed above, the server may compare the extracted characteristics to records at a searchable database. The server may compare the retrieved personally identifiable information against records at the searchable database. Communication interface 806 may also be configured to receive verification results from the server. Communication interface 806 may be built on wired or wireless technologies to transmit data to and receive data from the server.

Reading device 800 may additionally include feedback device 808. Feedback device 808 may be configured to provide instructions to a human inspector. For example, feedback device 808 may include a graphical interface to display textual messages or iconic indications to the human inspector. In some implementations, feedback device 808 may additionally include sound devices to alert the human inspector of the verification results, for example, through a text to speech technology.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), a FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media (transitory or non-transitory, as appropriate) suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for verifying a person presenting, at a point of service, a digital identification document that comprises a digital biometric of the person, the computer-implemented method comprising:
   receiving, at a computer processor, data encoding the digital identification document displayed on a mobile computing device, the digital identification document including the digital biometric and more than one digital watermarks encoding portions of personally identifiable information of the person and information indicating an issuing entity of the digital identification document;
   extracting one or more characteristics from the digital biometric;
   extracting a first portion of the personally identifiable information from a first digital watermark and a second portion of the personally identifiable information from a second digital watermark;
   determining that the first portion of the personally identifiable information and the second portion of the personally identifiable information are cross-correlated by determining that the first portion and the second portion meet a sufficient degree of match, wherein the sufficient degree of match is determined based on a degree of desired security associated with the verifying;
   in response to determining the first portion and the second portion are cross-correlated, comparing the personally identifiable information to the one or more characteristics to determine the digital identification document is authentic; and
   initiating a message indicating the digital identification document is authentic.

2. The computer-implemented method of claim 1, wherein the authenticating comprises:
   receiving a biometric of the person presenting the digital identification document at the point of service; and
   comparing the biometric of the person at the point of service with the digital biometric on the digital identification document.

3. The computer-implemented method of claim 2, further comprising:
   in response to the person identified according to the digital biometric on the digital identification document, providing a signal to indicate that the person be given access at the point of service.

4. The computer-implemented method of claim 1, wherein receiving data encoding the digital identification document comprises:
   receiving more than one digital watermarks embedded in the digital identification document, each digital watermark encoding a respective portion of the personally identifiable information of the person.

5. The computer-implemented method of claim 1, wherein authenticating the digital identification document comprises:
   providing, based on the information indicating the issuing entity, the first portion of the personally identifiable information and the second portion of the personally identifiable information to a server of the issuing entity, wherein the server is configured to determine whether the first portion of the personally identifiable information and the second portion of the personally identifiable information are cross-correlated; and
   receiving, from the server, an indication that the digital identification document is valid in response to the server determining that the first portion of the personally identifiable information and the second portion of the personally identifiable information are cross-correlated.

6. A computer system comprising a processor configured to perform operations to verify a person presenting, at a point of service, a digital identification document that comprises a digital biometric of the person, the operations comprising:
   receiving, at a computer processor, data encoding the digital identification document displayed on a mobile computing device, the digital identification document including the digital biometric and more than one digital watermarks encoding portions of personally identifiable information of the person and information indicating an issuing entity of the digital identification document;
   extracting one or more characteristics from the digital biometric;
   extracting a first portion of the personally identifiable information from a first digital watermark and a second portion of the personally identifiable information from a second digital watermark;

determining that the first portion of the personally identifiable information and the second portion of the personally identifiable information are cross-correlated by determining that the first portion and the second portion meet a sufficient degree of match, wherein the sufficient degree of match is determined based on a degree of desired security associated with the verifying;

in response to determining the first portion and the second portion are cross-correlated, comparing the personally identifiable information to the one or more characteristics to determine the digital identification document is authentic; and initiating a message indicating the digital identification document is authentic.

7. The computer system of claim 6, wherein the authenticating comprises:

receiving a biometric of the person presenting the digital identification document at the point of service; and comparing the biometric of the person at the point of service with the digital biometric on the digital identification document.

8. The computer system of claim 7, wherein the operations further comprising:

in response to the person identified according to the digital biometric on the identification document, providing a signal to indicate that the person be given access at the point of service.

9. The computer system of claim 6, wherein receiving data encoding the digital identification document comprises:

receiving more than one digital watermarks embedded in the digital identification document, each digital watermark encoding a respective portion of the personally identifiable information of the person.

10. The computer system of claim 6, wherein authenticating the digital identification document comprises:

providing, based on the information indicating the issuing entity, the first portion of the personally identifiable information and the second portion of the personally identifiable information to a server of the issuing entity, wherein the server is configured to determine whether first portion of the personally identifiable information and the second portion of the personally identifiable information are cross-correlated; and receiving, from the server, an indication that the digital identification document is valid in response to the server determining that the first portion of the personally identifiable information and the second portion of the personally identifiable information are cross-correlated.

11. A non-transitory computer readable medium, comprising software instructions that, when executed by a computer, causes the computer to perform operations of:

receiving, at a computer processor, data encoding a digital identification document displayed on a mobile computing device presented by a subject at a point of service, the digital identification document including the digital biometric and more than one digital watermarks encoding portions of personally identifiable information of the person and information indicating an issuing entity of the digital identification document;

extracting one or more characteristics from the digital biometric;

extracting a first portion of the personally identifiable information from a first digital watermark and a second portion of the personally identifiable information from a second digital watermark;

determining that the first portion of the personally identifiable information and the second portion of the personally identifiable information are cross-correlated by determining that the first portion and the second portion meet a sufficient degree of match, wherein the sufficient degree of match is determined based on a degree of desired security associated with the verifying;

in response to determining the first portion and the second portion are cross-correlated, comparing the personally identifiable information to the one or more characteristics to determine the digital identification document is authentic; and initiating a message indicating that the digital identification document is authentic.

12. The non-transitory computer readable medium of claim 11, wherein the authenticating comprises:

receiving a biometric of the person presenting the digital identification document at the point of service; and comparing the biometric of the person at the point of service with a digital biometric on the digital identification document.

13. The non-transitory computer readable medium of claim 12, wherein the operations further comprise:

in response to the person identified according to the digital biometric on the identification document, providing a signal to indicate that the person be given access at the point of service.

14. The non-transitory computer readable medium of claim 11, wherein receiving data encoding the digital identification document comprises:

receiving more than one digital watermarks embedded in the digital identification document, each digital watermark encoding a respective portion of the personally identifiable information of the person.

15. The non-transitory computer readable medium of claim 11, wherein authenticating the digital identification document comprises:

providing, based on the information indicating the issuing entity, the first portion of the personally identifiable information and the second portion of the personally identifiable information to a server of the issuing entity, wherein the server is configured to determine whether first portion of the personally identifiable information and the second portion of the personally identifiable information are cross-correlated; and receiving, from the server, an indication that the digital identification document is valid in response to the server determining that the first portion of the personally identifiable information and the second portion of the personally identifiable information are cross-correlated.

16. The computer-implemented method of claim 1 wherein the more than one digital watermarks are applied by more than one distinct digital watermarking mechanisms.

17. The computer-implemented method of claim 1 wherein correlating the first and second portions includes combining pieces of information from the first and second portions.

18. The computer system of claim 6 wherein the more than one digital watermarks are applied by more than one distinct digital watermarking mechanisms.

19. The computer system of claim 6 wherein correlating the first and second portions includes combining pieces of information from the first and second portions.

20. The non-transitory computer readable medium of claim 11 wherein the more than one digital watermarks are applied by more than one distinct digital watermarking mechanisms.

21. The non-transitory computer readable medium of claim 11 wherein correlating the first and second portions includes combining pieces of information from the first and second portions.

* * * * *